(12) United States Patent
Krycki et al.

(10) Patent No.: US 11,408,838 B2
(45) Date of Patent: Aug. 9, 2022

(54) METHOD AND DEVICE FOR MULTIELEMENT ANALYSIS ON THE BASIS OF NEUTRON ACTIVATION, AND USE

(71) Applicants: AACHEN INSTITUTE FOR NUCLEAR TRAINING GMBH, Stolberg (DE); FRAMATOME GMBH, Erlangen (DE)

(72) Inventors: Kai Krycki, Aachen (DE); John Kettler, Inden (DE); Andreas Havenith, Herzogenrath (DE)

(73) Assignees: AACHEN INSTITUTE FOR NUCLEAR TRAINING GMBH, Stolberg (DE); FRAMATOME GMBH, Erlangen (DE)

( * ) Notice: Subject to any disclaimer, the term of this patent is extended or adjusted under 35 U.S.C. 154(b) by 360 days.

(21) Appl. No.: 16/618,114

(22) PCT Filed: May 28, 2018

(86) PCT No.: PCT/DE2018/100516
§ 371 (c)(1),
(2) Date: Nov. 28, 2019

(87) PCT Pub. No.: WO2018/219406
PCT Pub. Date: Dec. 6, 2018

(65) Prior Publication Data
US 2020/0132613 A1    Apr. 30, 2020

(30) Foreign Application Priority Data

May 31, 2017  (DE) ..................... 10 2017 111 935.3
May 31, 2017  (EP) ..................... 17401060

(51) Int. Cl.
*G01N 23/22*     (2018.01)
*G01N 23/223*    (2006.01)
*G01T 3/00*      (2006.01)

(52) U.S. Cl.
CPC .......... *G01N 23/223* (2013.01); *G01T 3/001* (2013.01); *G01N 2223/0745* (2013.01)

(58) Field of Classification Search
CPC ...... G01N 23/22; G01N 23/223; G01N 23/00; G01N 23/05; G01N 23/095; G01N 23/025;
(Continued)

(56) References Cited

U.S. PATENT DOCUMENTS

| 5,078,952 A | 1/1992 | Gozani et al. |
| 2005/0004763 A1 | 1/2005 | Osucha et al. |

(Continued)

FOREIGN PATENT DOCUMENTS

| DE | 1 236 831 B | 3/1967 |
| DE | 690 28 205 T2 | 1/1997 |

(Continued)

OTHER PUBLICATIONS

M. Crittin et al.: "The new prompt gamma-ray activation facility at the Paul Scherrer Institute, Switzerland", Nuclear Instruments and Methods in Physics Research. Section A, vol. 449, pp. 221-236 (2000).

(Continued)

*Primary Examiner* — Don K Wong
(74) *Attorney, Agent, or Firm* — Norman B. Thot

(57) ABSTRACT

A method for a multielement analysis via neutron activation. The method includes generating fast neutrons with an energy in the range of 10 keV to 20 MeV and moderating the neutrons, irradiating the sample with the neutrons, and measuring the gamma radiation emitted by the irradiated (Continued)

sample using a detector to determine at least one element of the sample. The sample continuously irradiated in a non-pulsed fashion. The measurement is implemented during the irradiation. The determination of the at least one element includes an evaluation of the measured gamma radiation. The sample is subdivided into individual partitions and the measurement is implemented using a collimator. The evaluation includes a spatially resolved and energy-resolved determination of the neutron flux within the respective partition of the sample and calculation of energy-dependent photopeak efficiencies and neutron flux and neutron spectrum within a single partition of the sample by an approximation method.

20 Claims, 5 Drawing Sheets

(58) Field of Classification Search
CPC .. G01N 23/005; G01N 23/202; G01N 23/203; G01N 23/222; G01N 2223/652; G01N 2223/0745; G01V 5/00; G01T 3/001; G01T 3/00
See application file for complete search history.

(56) References Cited

U.S. PATENT DOCUMENTS

| | | |
|---|---|---|
| 2005/0195932 A1 | 9/2005 | Keyser et al. |
| 2006/0115037 A1 | 6/2006 | Pedersen et al. |
| 2010/0065727 A1 | 3/2010 | Choi |
| 2012/0046867 A1 | 2/2012 | Faber et al. |
| 2013/0208843 A1 | 8/2013 | Mauerhofer et al. |
| 2015/0338356 A1 | 11/2015 | Charette et al. |
| 2017/0307550 A1* | 10/2017 | Torbert, III .......... G01N 23/222 |

FOREIGN PATENT DOCUMENTS

| | | |
|---|---|---|
| DE | 102 15 070 A1 | 10/2003 |
| DE | 603 10 118 T2 | 7/2007 |
| DE | 10 2007 029 778 B4 | 4/2009 |
| DE | 10 2010 031 844 A1 | 1/2012 |
| EP | 0 493 545 B1 | 11/1996 |
| EP | 1 882 929 B1 | 10/2011 |
| GB | 2 083 212 A | 3/1982 |
| WO | WO 01/07888 A2 | 2/2001 |
| WO | WO 2012/010162 A1 | 1/2012 |

OTHER PUBLICATIONS

Din ISO 11929-1: Determination of the characteristic limits (decision threshold, detection limit and limits of the coverage interval) for measurements of ionizing radiation—Fundamentals and application, pp. 1-41 (2019).
P. S. Brantley et al.: "The Simplified $P_3$ Approximation", Nuclear Science and Engineering: vol. 134, pp. 1-21 (2000).
A. Trkov et al.: "On the self-shielding factors in neutron activation analysis", Neclear Instruments and Methods in Physics Research A,610, pp. 553-565 (2009).
G. L. Molnár: Handbook of Prompt Gamma Activation Analysis with Neutron Beams, Kluwer Academic Publishers, pp. 9-20, (2004).
R. M. W. Overwater: "The Physics of Big Sample Instrumental Neutron Activation Analysis", Dissertation, Delft University of Technology, Delft University Press, pp. 1-188 (1994).
V. Kliment et al.: "Continuous Neutron Activation Analysis", Journal of Radioanalytical Chemistry, vol. 10, pp. 273-297 (1972).
Wikipedia: "Neutronenquelle", https://de.wikipedia.org/w/index. php?title=Neutronenquelle&oldid=164883025, version Apr. 24, 2017, with English translation.
E. Baas: Neutron Activation Analysis of Inhomogeneous Large Samples; An Explorative Study, DUP Science, pp. 1-160 (2004).
J. P. Holloway et al.: The fixed point formulation for large sample PGNAA—Part 1: theory, Nuclear Instruments and Methods in Physics Research A 522, pp. 529-544 (2004).
H. Akkurt et al.: "The fixed point formulation for large sample PGNAA—Part 2: experimental demonstration", Nuclear Instruments and Methods in Physics Research A 522, pp. 545-557 (2004).

* cited by examiner

METHOD AND DEVICE FOR MULTIELEMENT ANALYSIS ON THE BASIS OF NEUTRON ACTIVATION, AND USE

CROSS REFERENCE TO PRIOR APPLICATIONS

This application is a U.S. National Phase application under 35 U.S.C. § 371 of International Application No. PCT/DE2018/100516, filed on May 28, 2018 and which claims benefit to German Patent Application No. 10 2017 111 935.3, filed on May 31, 2017, and to European Patent Application No. 17401060.3, filed on May 31, 2017. The International Application was published in German on Dec. 6, 2018 as WO 2018/219406 A1 under PCT Article 21(2).

TECHNICAL FIELD

The present invention relates to a method for multielement analysis on the basis of neutron activation by irradiating a sample with neutrons. Further, the present invention relates to a corresponding apparatus comprising at least one collimatable detector. Not least, the present invention also relates to the use a control device or of a computer program product therefor. In particular, the invention relates to a method and apparatus according to the preamble of the respective independent or alternative independent claim.

BACKGROUND OF THE INVENTION

Much importance is placed on the analysis of substances or materials, in particular in respect of the elemental composition thereof, in many fields of industry, particularly in respect of hazardous goods or wastes or recycling materials or raw materials or in quality control of semifinished products or industrial products. One of the analysis methods carried out previously is the so-called multielement analysis, by means of which individual elements of a sample are determined without the exact composition of the sample needing to be known in advance.

The multielement analysis can be implemented by means of neutron activation or else, for example, by means of x-ray fluorescence analysis or mass spectrometry. Previously, a multielement analysis by means of neutron activation was implemented by way of an irradiation according to certain time specifications. In the case of pulsed neutron irradiation, meaningful measurement results were found to be able to be ensured if, following a certain time window, prompt gamma radiation is evaluated as a function of the manner of the pulsed irradiation. The time window for the detection of gamma radiation is started after a waiting time that follows the end of each neutron pulse and it finishes before the next neutron pulse is emitted.

WO 2012/010162 A1 and DE 10 2010 031 844 A1 describe a method for nondestructive element analysis of large-volume samples using neutron radiation and an apparatus for carrying out the method. In the method, the sample is irradiated in pulsed fashion by fast neutrons, wherein the gamma radiation emitted by the sample is measured after a certain time window following a neutron pulse before a new neutron pulse is emitted toward the sample. Here, the measurement method is also based on the discovery that the measurement can be facilitated by a moderation process and by observing a time window after a respective neutron pulse. The detection in the detector of induced gamma radiation, resulting from inelastic interactions, can be filtered out on account of the time window following a respective neutron pulse and consequently can be masked during the measurement. Prompt gamma radiation is evaluated as gamma radiation.

EP 1 882 929 B1 and WO 01/07888 A2, too, describe methods in which neutrons are radiated on the sample in pulsed fashion and a time window is observed following each pulse, until the prompt gamma radiation emitted by the sample is measured. Comparable methods are also described in, e.g., EP 0 493 545 B1 and DE 10 2007 029 778 B4.

The neutron activation analysis is also described in the following further publications: US 2015/0338356 A1, DE 603 10 118 T2, US 2005/0004763 A1, US 2012/046867 A1, DE 102 15 070 A1, DE 12 36 831 B.

SUMMARY OF THE INVENTION

It is an object to provide a method and an apparatus that can simplify the multielement analysis of samples by means of neutron activation. It is also an object to configure a method and an apparatus for multielement analysis by means of neutron activation in such a way that a broad field of application arises. The object can also be considered as that of providing an uncomplicated, fast measurement method for the user, it being possible to apply said method as independently as possible of the type or size or material composition of the sample to be analyzed. Not least, it is an object to provide a nondestructive method, which is as flexible as possible, and a corresponding apparatus for multielement analysis on the basis of neutron activation, with a very high quality or with a very reliable, safe manner of measurement and evaluation of emitted gamma radiation, even in the case where a sample to be examined should be difficult to analyze in respect of the elemental composition and the sample geometry and/or where taking a partial sample of the sample to be examined, which is destructive or influences the result, is not desired.

At least one of these objects is achieved by a method according to claim 1 and by an apparatus according to the alternative independent apparatus claim. Advantageous developments of the invention are explained in the respective dependent claims. The features of the exemplary embodiments described below are combinable with one another provided this is not explicitly prohibited.

A method for multielement analysis on the basis of neutron activation is carried out with the following steps: generating fast neutrons with an energy in the range of 10 keV to 20 MeV; irradiating a sample with the neutrons; measuring the gamma radiation emitted by the irradiated sample in order to determine at least one element of the sample. According to the invention, it is proposed that the sample is irradiated continuously in non-pulsed fashion, wherein the measurement is implemented during the irradiation, time-independently of the irradiation (independently of the time profile of the irradiation), in particular without time windows predetermined by neutron pulses, in particular concurrently with the irradiation over the same time period as the irradiation, in particular continuously during the irradiation.

This can provide a nondestructive method for multielement analysis on the basis of neutron activation for various types of samples, with high measurement flexibility and robust, reproducible and reliable results. The sample is irradiated continuously with neutrons without individual pulses, for example continuously over a time period of several seconds or minutes or hours, wherein the gamma radiation emitted by the sample can be measured concurrently with the irradiation. It was found here that the neutrons can be generated, in particular, by means of a generator configured to fuse deuterons (deuterium nuclei), in particular with deuterium gas as a gaseous target or as a fuel. The present invention facilitates the measurement and evaluation on the basis of comparatively low-energy irradiation over a long period of time, as a result of which the analysis can be carried out very exactly and reproducibly.

Pulsed irradiation was previously used in many measurement problems in the prior art, with a waiting time previously being required after a respective neutron pulse. Previously, the pulse length usually lay in the range of ten to several hundred microseconds (µs). In contrast to pulsed irradiation, both the prompt and delayed gamma radiation emitted by the sample is measured concurrently with the irradiation, with the energy resolution of the detector facilitating the subdivision into prompt and delayed gamma radiation. In contrast to pulsed irradiation, there is no need to observe a time window (until now, this was usually at least 5 µs) until the emitted radiation can be measured/evaluated. There is no need to observe a waiting time before the start of the detection of the gamma radiation. It is no longer necessary to have a temporal coordination with the end of a respective neutron pulse; instead, irradiation and measurement can be carried out continuously. This also allows the measurement time for the analysis of the samples to be reduced.

The measurement can be implemented completely without a time window, or optionally partially with a time window. In any case, at least some of the emitted gamma radiation is measured in time-independent fashion without a time window. The method may comprise a moderation of the fast neutrons, at least intermittently.

The simultaneous measurement of the gamma radiation allows a high efficiency of the measuring installation. Here, both prompt and delayed gamma radiation can be measured in a standard mode of operation, with an emphasis on prompt gamma radiation. The measurement concurrently with the irradiation can be implemented in continuous fashion, in particular with the same time specifications as the irradiation, or in individual time windows independently of the time specifications for the irradiation. By way of example, the irradiation is continuous, but the measurement is optionally only carried out during short intervals. A consequence of concurrent measurement and continuous irradiation is that there is no longer any need to take account of arbitrary time windows; instead, the measurement and evaluation can be carried out very flexibly and both types of radiation, i.e., prompt and delayed gamma radiation, can be evaluated. The measurement/detection of the gamma radiation independently of temporal relationships during the neutron irradiation can be highlighted as a peculiarity of the present invention.

The irradiation was pulsed according to the prior art, with a waiting time previously being required after a respective neutron pulse. Previously, the pulse length usually lay in the range of ten to several hundred microseconds (µs). The background signal in the previously employed measuring installations immediately following a respective neutron pulse was too high, and so the signal-to-noise ratio (SNR) directly following the neutron pulse was too poor to be able to evaluate the measurement. Therefore, it was not possible to detect a meaningful spectrum of the gamma radiation. In the previous methods, a certain time window was granted for the neutrons in many measurement problems so as to be able to undertake the measurement, in particular following the emission of the neutrons. Usually, this time window is at least 5 µs. The probability of interactions in the sample increases during this time window, and so measurements could be carried out with a sufficiently good signal-to-noise ratio SNR after a certain waiting time (or moderation time) following a respective neutron pulse. The data acquisition was implemented in time-offset fashion as a function of the neutron pulses.

By contrast, the gamma radiation measured and evaluated as per the present method is, firstly, prompt gamma radiation, which is emitted immediately after an interaction of the neutrons with the atomic nuclei of the sample. The time period until emission is approximately 10 exp-16 to 10 exp-12 seconds in the case of prompt gamma radiation; this time period is so short that this can be referred to as instantaneous/immediate emission. In the case of prompt gamma radiation, there is no time offset, relevant from a measurement point of view, between neutron capture and the emission of the gamma radiation. Secondly, the delayed gamma radiation is also affected; this is emitted upon the decay of the activated atomic nuclei in time offset fashion as per the characteristic half-life. Delayed gamma radiation is emitted by the atomic nucleus with a time offset following a neutron capture according to the characteristic half-life of the formed radionuclide. In conventional neutron activation analysis (NAA), the cross section for the neutron capture and the half-life of the activated radionuclide have an influence on the emitted radiation. According to the invention, two measurement concepts can be linked with one another: conventional neutron activation analysis (NAA) on the one hand and prompt gamma NAA (PGNAA) on the other hand. Here, a distinction can be made between prompt and delayed gamma radiation on the basis of the energy of the gamma radiation (in particular, the position of the maximum of a peak) and the energetic resolution of the detector.

According to expectation, most knowledge can be gained by evaluating prompt gamma radiation. However, there is a whole host of elements, such as lead, for example, that do not supply a good prompt signal. Therefore, it is expedient in many applications or many types of material samples to evaluate both prompt and delayed gamma radiation. Selectively, the irradiation can optionally also be implemented in pulsed fashion, at least intermittently, in order to measure delayed gamma radiation only. Selectively, only delayed gamma radiation can be measured independently of the type of irradiation, particularly in the case of analysis in respect of lead.

The gamma radiation emitted by the sample is measured in energy-resolved fashion in one or more detectors. This yields a measured gamma spectrum, in particular corresponding to a record of the number of events, detected in a gamma ray detector, as a function of energy. The elements of the sample are identified on the basis of the energy of the gamma radiation. An elemental mass is quantified by means of the measured energy-dependent radiation intensity. Following the subtraction of the background signal, the mass fraction of an element contained in the sample is evaluated from the area of the photopeak caused by the element in the gamma spectrum. Since, as a rule, the irradiated elements in the sample emit gamma radiation at different energies, all evaluable gamma energies of an element are taken into account during the analytic evaluation, both for determining the mass and in the uncertainty analysis for the mass determination. It was found that the analysis on the basis of all evaluable gamma energies of an element is advantageous in that a broad data basis can be used and in that plausibility checks can be carried out. Further, a still remaining measurement uncertainty can be reduced, and the accuracy of the measurement method can be increased.

The analytic evaluation for determining the mass in the case of multielement analysis is based on, in particular, the calculation of energy-dependent photopeak efficiencies of the gamma emissions from the sample and from individual partitions of the sample, and the calculation of the neutron spectrum and the neutron flux within the sample and within partitions of the sample. Initially, assumptions about the elementary composition can be made for these calculations; these assumptions are derived from the evaluation of the gamma spectrum. It was found that the results of the multielement analysis define the initial assumptions, made a priori, for calculating photopeak efficiencies, neutron spectrum and neutron flux more precisely and are also able to increase the accuracy of the measurement method such that the method is preferably carried out iteratively in respect of the composition of the sample until the calculated composition of sample stabilizes. As a result of this type of analytic procedure, the nondestructive method for multielement analysis on the basis of neutron activation can be carried out automatically, in particular iteratively, wherein only the form of the sample body and the mass, as well as neutron source strength, are required as input parameters. Here, the neutron source strength can be obtained from the measuring installation or apparatus as a controlled variable.

This method for multielement analysis on the basis of neutron activation and an apparatus for carrying out the method allow various samples to be examined nondestructively in a simple manner in respect of the substance composition. Examples of analyzable samples may include: soil samples, ashes, water samples, sludges, electrical wastes, chemotoxic or radioactive wastes. Here, samples can be analyzed in batch operation or online on a mass flow. Samples can be analyzed, inter alia, for the purposes of quality assurance, targeted sorting, process control and/or verification management.

In comparison with previous methods, the method according to the invention is distinguished, in particular, by the following properties: continuous emission of fast neutrons; continuous measurement of the gamma spectra; collimated measurement of the entire sample or of individual partial volumes of the sample (partitions); the sample is irradiated, in particular, with 2.45 MeV neutrons (<10 MeV, comparatively low start energy); gamma radiation is evaluated by evaluating the signal of each partition; the analytic evaluation for determining the elemental masses is implemented, in particular, on the basis of the simplified assumption that the elemental mass is homogeneously distributed within a partition; and/or there is a rotation and axial displacement of the sample body with respect to the detector. There can be a moderation of fast neutrons in a moderation chamber, in the sample chamber and/or in the sample itself after and during the emission of fast neutrons, until said neutrons are sufficiently thermalized.

In contrast thereto, the analysis was previously usually carried out by a method have the following properties: pulsed irradiation with fast neutrons; measurement of the gamma spectra in time intervals or time windows, defined in advance, following a respective neutron pulse or between the individual neutron pulses; the sample is measured integrally, without a collimator being defined; in particular, the sample is irradiated by 14.1 MeV neutrons (>10 MeV); there is a rotation of the sample body in front of the detector, and the gamma radiation is measured as a function of a rotational angle of the irradiated sample; the analytic evaluation for determining inhomogeneously distributed elemental masses is implemented on the basis of the simplified assumption that the elemental mass is punctiform. The integral neutron flux in the sample can be determined by means of metallic sheathing of the sample.

Terms used in conjunction with the present invention are discussed briefly below.

Shielding should preferably be understood to mean a material or a unit which surrounds the apparatus or measuring installation and which reduces the gamma and neutron ambient dose rate outside of the measuring installation.

Irradiation or irradiating should preferably be understood to mean an operation of a neutron generator and a generation and emission of neutrons toward at least one sample in order to bring about the emission of gamma radiation, characteristic for the elemental composition, from the sample.

A detector unit should preferably be understood to mean a unit or assembly of the measuring installation, comprising one or more detectors, said detector unit performing a high-resolution measurement of the gamma radiation emitted by the sample or by individual partitions of the sample. A respective detector can have an extent of, e.g., 5 to 10 cm in one spatial direction.

A collimator should preferably be understood to mean a unit or assembly of the measuring installation, said unit restricting the field of view of a detector to a spatial region with a higher detection probability for gamma radiation. The collimation can also be implemented specifically in respect of individual segments/partitions of the sample.

A measuring installation should preferably be understood to mean a metrological installation for generating ionizing radiation for the purposes of the multielement analysis of samples. In one embodiment, the apparatus described here can be referred to as a measuring installation.

A moderation chamber should preferably be understood to mean an assembly of the measuring installation for moderating neutrons, in particular by means of graphite or at least partly consisting of graphite. The moderation may optionally be provided in the sample chamber depending on the desired type of the measurement/evaluation and/or it can be implemented in a separate moderation chamber.

A neutron generator should preferably be understood to mean an assembly of the measuring installation, said neutron generator emitting fast neutrons (in particular, 2.45 MeV neutrons or, further, also generally neutrons with <10 MeV) and being disposed within the shielding. Optionally, the neutron generator can be surrounded by a moderation chamber provided separately from the sample chamber.

The neutron flux should preferably be understood to mean a product of neutron density (free neutrons per cm3) and the mean value of the speed of the neutrons (cm/s).

The neutron spectrum should preferably be understood to mean the relative distribution of the neutron energy over the entire energy range of the neutrons.

A partition should preferably be understood to mean a pre-definable/predefined spatial region within the sample, wherein the sum of all partitions yields the entire sample or defines the entire sample body. A preferred number of partitions can be chosen depending on the size of the sample and on the measuring problem, e.g., between 1 and 60 partitions. Here, the volume of a partition can lie in the range from a few cubic centimeters to liters. In the case of very small samples, e.g., a few cubic centimeters, it may be advantageous to define only a single partition.

The photopeak efficiency should preferably be understood to mean a detection probability for the complete energy deposition of a gamma emission in the detector.

Here, gamma emission can be understood to mean gamma radiation independently of the energy level thereof. Specific gamma radiation has a specific energy. The gamma emission as such is the reaction following an irradiation with neutrons. The analysis is therefore carried out specifically with respect to individual types of gamma radiation from the spectrum of a gamma emission. Signals of prompt and delayed gamma radiation are detected by way of the spectrum of the gamma emission.

A sample should preferably be understood to mean a solid or liquid amount of material that is selected for the analysis and represents the examination object, e.g., comprising soil samples, ashes, water samples, sludges and chemotoxic or radioactive wastes.

A sample chamber should preferably be understood to mean an assembly of the measuring installation in which the sample is disposed during the irradiation and in which the sample can optionally also be displaced, in particular during the irradiation.

A sample carrier should preferably be understood to mean an assembly of the measuring installation, which receives the sample and which is disposed within the sample chamber. A spatial displacement of the sample can be implemented by means of the sample carrier.

Below, the method according to the invention is initially described in general, with details of individual aspects of the invention being discussed thereafter.

The operation of one or more neutron generators causes a sample within a measuring installation to be irradiated continuously by neutrons, and the gamma radiation induced/emitted as a result of the neutron interactions is measured concurrently with the irradiation.

As already mentioned, the gamma radiation is, firstly, prompt gamma radiation that is emitted immediately following an interaction of the neutrons with the atomic nuclei of the sample and, secondly, delayed gamma radiation that is emitted following the decay of the activated atomic nuclei in accordance with the characteristic half-life. The gamma radiation emitted by the sample can be measured in energy-resolved fashion in one or more detectors. This yields a measured gamma spectrum per detector. The gamma spectrum is the record of the number of events detected in a gamma detector as a function of energy. The elements of the sample are identified on the basis of the energy of the gamma radiation. An elemental mass can be quantified by means of the measured energy-dependent radiation intensity.

Calculation of the Elemental Masses in the Case of the Partitioned and Non-Partitioned Measurement The mass fraction of an element contained in the sample is calculated from the area of the photopeak caused by the element in the gamma spectrum, after the background signal has been subtracted. The net photopeak count rate registered during the multielement analysis depends on the influence parameters set forth below; this relationship was considered, in particular, in the following publication: G. L. Molnar (Ed.), Handbook of Prompt Gamma Activation Analysis with Neutron Beams, Kluwer Academic Publishers, ISBN 1-4020-1304-3 (2004).

$$(P_R)_{E_\gamma} = \frac{N_A}{M} \cdot \int_V \int_0^\infty m(x) \cdot \varepsilon_{E_\gamma}(x) \cdot \sigma_\gamma(E_n) \cdot \Phi(x, E_n) dE_n dx \quad (1)$$

where
$(P_R)_{E_\gamma}$ is the net count rate of the photopeak of the element for the gamma energy $E_\gamma$,
M is the molar mass of the corresponding element,
$N_A = 6.0221408 \cdot 10^{23}$ is the Avogadro constant,
x is the position in the sample volume V,
$E_n$ is the neutron energy,
m(x) is the distribution function for mass of the corresponding element in the sample volume,
$\varepsilon_{E_\gamma}(x)$ is the photopeak efficiency for gamma rays of the element at the corresponding energy $E_\gamma$ emitted at the position x,
$\sigma_\gamma(E_n)$ is the partial gamma production cross section, and
$\Phi(x, E_n)$ is the neutron flux as a function of position and energy in the sample.

Here, the partial gamma production cross section depends on the considered element and contains both the intensity of the considered gamma line $E_\gamma$ and also the natural frequency of the associated isotope of the element. Since, as a rule, the irradiated elements in the sample emit gamma radiation at different energies, all evaluable gamma energies $E_\gamma$ of an element are taken into account in the analytic evaluation for determining the mass and for the uncertainty analysis for the mass determination. Taking account the plurality of gamma energies from one element reduces the uncertainty of the measurement method.

Preferably, the sample is subdivided into partitions and measured/analyzed in segment fashion. To this end, one or more partitions of the sample are situated in the collimated field of view of the detector during an individual gamma-spectrometric measurement (FIG. 4). The field of view of the detector is the spatial region that has an increased detection probability of gamma radiation on account of the collimator geometry. So that the respective partitions can be aligned in optimal fashion with respect to the field of view of the detector, the sample can be moved, in particular rotated and displaced, in front of the detector. The energy-dependent detection probabilities of emitted gamma radiation from the sample or from a respective partition are referred to as photopeak efficiencies. The gamma radiation is attenuated within the partitions of the sample, and so partitions that face the detector and are situated in the field of view of the collimator have higher photopeak efficiencies than partitions outside of the field of view of the detector. Consequently, the robustness of a measurement result in respect of the elemental composition of the respective partition can be increased, particularly if a plurality of gamma-spectrometric measurements are taken into account.

As a result of the collimation to one partition, the SNR for the respective partition, in particular, can be improved. If gamma-spectrometric measurements of a plurality of partitions are evaluated in combined fashion, a possibly remaining uncertainty can be reduced.

Particular advantages were found to arise above a total of four partitions, depending on the size of the sample body. Here, the geometry of the partition is preferably defined as a function of the geometry of the sample body and the measurement problem.

In cylindrical samples, the sample is divided (FIG. 4) into partitions according to layers and sectors, in particular. In particular, partitions are generated in the form of cake slices, i.e., as three-dimensional cylinder segments. A horizontal partitioning (in particular as per cuts orthogonal to an axis of symmetry of a cylindrical sample) is referred to as a layer and an angle-dependent partitioning is referred to as an (angle) sector. In an additional subdivision of angle sectors as a function of the distance from the axis of symmetry, these partitions are specifically referred to as radial sectors. A cubic or cuboid sample, in particular, can be subdivided into individual voxels. Each voxel represents a partition. The respective voxel likewise has a cubic or cuboid geometry.

The elemental masses in the individual partitions are determined as set forth below. Here, this is based, in particular, on the assumption that the mass of an element mk (symbol mk) is distributed homogeneously within a partition. Consequently, N gamma spectra are recorded in the case of N partitions and N net photopeak count rates arise for each gamma energy. Variants may arise depending on the type of partitions, particularly in the case of radial sectors. Then, N can be replaced by K and, e.g., the following applies: N gamma spectra are recorded in N measurements in the case of K partitions, where K is greater than or equal to N, and N net photopeak count rates arise for each gamma energy. Equation (1) can now be reduced to the following sum for a gamma energy in the case of a collimated measurement of the partition i, for K or N partitions, where the index K runs over the partitions, promising a simple, robust analysis:

$$(P_R)_{E_\gamma}^i = \frac{N_A}{M} \cdot \sum_{k=1}^{K} m_k \cdot \varepsilon_{E_\gamma}^{i \leftarrow k} \cdot \sigma_{E_\gamma}^{ik} \cdot \Phi_k^i. \tag{2}$$

where $\varepsilon_{E_\gamma}^{i \leftarrow k}$ is the integral photopeak efficiency of the partition k in the measurement i, $\sigma_{E_\gamma}^{ik}$ is the integral (n, γ) cross section for the gamma energy in partition k during the measurement i, formed by $$\sigma_{E_\gamma}^{ik} = \frac{\int_0^\infty \sigma_\gamma(E_n) \cdot \Phi_k^i(E_n) dE_n}{\int_0^\infty \Phi_k^i(E_n) dE_n}$$

and where $\Phi_k^i$ is the integral neutron flux in partition k during the measurement i, formed by $$\Phi_k^i = \int_0^\infty \Phi_k^i(E_n) dE_n.$$

Consequently, a linear system of equations with dimensions N×N or N×K arises from Equation (2), which can be solved for the elemental masses of the individual partitions. This linear system of equations has the form:

$$A \cdot m = b \tag{3}$$

where A is a matrix of dimension N×N or N×K and m, b are vectors of dimension N×1 or K×1. The entries in the matrix A are given by:

$$A_{ik} = \frac{N_A}{M} \cdot \varepsilon_{E_\gamma}^{i \leftarrow k} \cdot \sigma_{E_\gamma}^{ik} \cdot \Phi_k^i.$$

The entries of m are given by mi, and the entries of b are given by $$b_i = (P_R)_{E_\gamma}^i.$$

In order only to obtain physically meaningful, positive and unique results for the solution of the system of equations in particular, a so-called "nonnegative least squares" method can be applied in the numerical solution to the system of equations.

A segmented/partitioned measurement may not be necessary if simplifying assumptions can be made for an application in respect of the homogeneity of the mass distribution, the neutron flux distribution and/or the photopeak efficiencies in the entire sample, in particular on the basis of the parameter for the size and composition of the sample. It could be shown that, in such a case, the sample can be measured in a single, preferably collimated measurement and only a single gamma spectrum can be recorded. Then, equation (2) reduces to the following simple linear relationship:

$$(P_R)_{E_\gamma} = \frac{m \cdot \varepsilon_{E_\gamma} \cdot N_A \cdot \sigma_{E_\gamma} \cdot \Phi}{M}, \tag{4}$$

where $\varepsilon_{E_\gamma}$ is the integral photopeak efficiency of the sample, $\sigma_{E_\gamma}$ is the integral (n, γ) cross section for the gamma energy in the sample, $\Phi$ is the integral neutron flux in the sample.

This equation can be solved directly for the elemental mass m. The corresponding parameters can be calculated in the same way for both the segmented/partitioned case and the non-segmented case.

A mass m of the corresponding element is calculated for each gamma energy, be it in a partition or be it in the entire sample volume. The measurement uncertaintyu (m) for this value is determined pursuant to DIN ISO 11929, as may also be gathered from the following publication published by the German Institute for Standardization: Determination of the characteristic limits (decision threshold, detection limit and limits of the confidence interval) for measurements of ionizing radiation—Fundamentals and application (ISO 11929: 2010) (2011).

Since an element emits gamma radiation with different gamma energies, the mass of the element is determined as a weighted average of the individual determined masses as a measurement result. The weighting is implemented on the basis of the calculated uncertainties.

Automatic Identification of the Elements Contained in the Sample

The elements contained in the sample can be identified automatically on the basis of the recorded gamma spectra. A characteristic emission signature of the gamma energies with corresponding intensities can be created for each element from a nuclear physics database. The signals at the known gamma energies of the elements in the spectrum are compared to this signature by means of a computer program. A statistical analysis of the degree of correspondence provides a list of the elements that are most likely to be contained in the sample. Not only the gamma energies of the prompt gamma radiation but also the gamma energies of the delayed gamma radiation are used for this identification. In particular, the advantage of the method being able to be applied to a multiplicity of elements arises as a result thereof.

Method for Determining the Photopeak Efficiencies

The energy-dependent photopeak efficiencies of an element are determined under the assumption of a homogeneous element and mass distribution in a partition of the sample or in the entire sample. The mean density of the partition of the sample can be determined by dividing the mass of the sample by the sample volume and/or by a transmission measurement with the aid of a gamma emitter, such as, e.g., Co-60 or Eu-154. The transmission measurement can serve as an extended measurement for characterizing the sample, for example in order to be able to determine the fill level of a fluid to be examined or the fill in a drum (sample). In order to calculate the photopeak efficiencies, a computer program is used to generate random points in the sample volume and a large number of random trajectories are generated in the direction of the detector from this point in the next step. Then, the path lengths in the different materials are determined along an individual trajectory and the energy-dependent probabilities of absorption and scattering along the trajectory are calculated from the attenuation coefficients of the materials. An energy-dependent probability for the complete deposition of the gamma energy in the detector is calculated from the path length in the detector and the energy-dependent cross sections for the photoelectric reaction, the pair production and the Compton scattering. Both probabilities are combined in order to obtain the probability of the detection of a photon along the trajectory for every possible gamma energy. The energy-dependent photopeak efficiency for this initial point emerges from an averaging over all trajectories with the same initial point. The results of all energy-dependent photopeak efficiencies of the initial points in one partition are averaged in order to obtain the corresponding integral photopeak efficiency of this partition for each gamma energy.

Method for Determining Neutron Flux and Neutron Spectrum

For the analytic evaluation to determine the elemental masses of the sample, the neutron flux and the energy-resolved neutron spectrum within the sample or the individual partitions of the sample are determined by an analytic method in addition to the energy—dependent photopeak efficiencies of the gamma emissions. Here, a diffusion approximation of the linear Boltzmann equation can be solved numerically. The input parameters for this system of equations are calculated from simulation calculations of the neutron flux and of the neutron spectrum in the empty sample chamber and/or from the neutron flux outside of the sample captured by measurement.

The optional determination of the neutron flux within the sample chamber and outside of the sample by measurement is described in the following paragraph.

For the purposes of evaluating the measurement data, the total or absolute neutron flux in each partition can optionally also be determined by one or more neutron detectors, which may be attached outside of the sample within the measurement chamber. The total neutron flux in each individual partition can be reconstructed from the measurement data of the respective neutron detector. In particular, gas-filled proportional count tubes with BF3 ($BF_3$) or 3He ($^3He$) can be used as neutron detectors, in particular as neutron sensitive material that is particularly well-suited to measuring the thermal neutron flux. The detector may have a cylindrical geometry, in particular with a used length corresponding to the height of the measurement level. This simplifies the detection or measurement of the neutron flux of the entire level. The neutron detectors are preferably disposed within the measurement chamber at the points of the expected maximum and minimum thermal neutron flux, and optionally also at additional points, preferably next to the apertures of a/the collimator, in particular at the same distance from the neutron source point (neutron source) in each case. In particular, at least four neutron detectors are disposed in the measurement chamber, level with the detectors. In order to determine the vertical distribution of the neutron flux, the same arrangement of neutron detectors can be provided at levels above and below the measurement level, within the meaning of redundant neutron detector levels. The total neutron flux in the partitions can be reconstructed or determined from the measurement data obtained thus, in particular taking into account the set neutron source strength, the weight and volume of the sample and the (spatially resolved) material composition of the sample. Here, the material composition of the sample can be resorted to. The reconstruction can be implemented as part of an iterative evaluation process for the measurement data. In particular, a spatially resolved reconstruction is implemented taking into account a known attenuation behavior of the sample material (in particular taking into account attenuation coefficients) in response to the neutron flux and on the basis of characteristics of the neutron flux, determined by simulation, at the respective measurement points as a function of previously described influence or input parameters.

Consequently, a neutron detection can also be implemented within the sample chamber in addition to the gamma ray detection; said neutron detection, in particular, serving the purpose of measuring the total neutron flux in integral fashion over an energy range such that the respective neutron fluxes in the respective partitions can be reconstructed. The respective elemental mass can be quantified from the total neutron fluxes and from the neutron spectra and the measured gamma spectra. This provides good robustness or meaningfulness of the measurement results. Optionally, the source strength of the neutron generator can also be used, alternatively or additionally, as an input variable (in particular, for the purposes of measurement redundancy).

Usually, the neutron flux in the sample was previously determined by virtue of determining energy-dependent correction factors in integral fashion for the entire sample. The manner of this calculation was considered, in particular, in the following publication: A. Trkov, G. Zerovnik, L. Snoj, and M. Ravnik: On the self-shielding factors in neutron activation analysis, Nuclear Instruments and Methods in Physics Research A, 610, pp. 553-565 (2009). For large-volume samples, an approximate method for determining the neutron flux without energy dependence, in particular for specific geometries that allow a reduction to two spatial dimensions, was proposed in the publication by R. Overwater from 1994, which is specified in more detail below.

The neutron flux and the neutron spectrum within the sample or within individual partitions of the sample can be determined in automated fashion in the method described here (by a computer program), wherein a diffusion approximation of the linear Boltzmann equation can be solved numerically in spatially resolved and energy-resolved fashion (with all three spatial dimensions being taken into account) and the input parameters for this system of equations can be calculated from simulation calculations of the neutron flux and of the neutron spectrum in the empty sample chamber and/or from the neutron flux outside of the sample (material being measured) detected by measurement.

The spatially resolved and energy resolved neutron flux in the sample can be determined from the solution of the full Boltzmann transport equation for neutrons:

$$\Phi(x, E_n) = \int_{S^2} \Psi(x, E_n, \Omega) d\Omega, \quad (5)$$

where ∩ denotes the directional variable and W consequently satisfies the following equation:

$$\Omega \cdot \nabla_x \Psi(\underline{x}, E_n, \Omega) + \sum_t (\underline{x}, E_n) \Psi(\underline{x}, E_n, \Omega) = \quad (6)$$

$$\int_{S^2} \int_0^\infty \sum_s (\underline{x}, E'_n, E_n, \Omega', \Omega) \Psi(\underline{x}, E'_n, \Omega') dE'_n d\Omega'$$

Here, $\Sigma_t$ denotes the total cross section and $\Sigma_S$ denotes the scattering cross section for neutrons of the sample material, which are composed from the individual cross sections of the elements contained in the sample.

Equation (6) is approximated by a coupled system of diffusion equations, corresponding to the so-called SP3 approximation; said relationship is considered, in particular, in the following publication: P. S. Brantley and E. W. Larson, The Simplified P3 Approximation, Nuclear Science and Engineering, 134, pp. 1-21 (2000). This system of equations is numerically solved in multigroup form by means of a computer program. As a result, the integral neutron flux and neutron spectrum can be obtained in each partition of the sample, resolved in the corresponding energy groups. In order to determine the input parameter, the energy-resolved flux through the boundaries of the sample or the measurement chamber is calculated on the basis of simulation calculations for the neutron flux in the empty measurement chamber. The parameters of the system of equations emerge from the elemental composition of the sample, wherein, in the first step, the input parameters are calculated from the simulated neutron flux and neutron spectrum in the empty sample chamber and/or from the neutron flux outside of the sample detected by measurement, in particular under an assumption in relation to a homogeneity of the sample and the elemental composition of the sample or the partitions. The neutron flux and neutron spectrum can be calculated and evaluated, in each case individually, for a respective partition, in particular by virtue of the respective partition being defined in spatial regions on the basis of a virtual subdivision of the sample.

Automated Iterative Approach

The result of the analytic evaluation, or the most important result, is the elemental composition of the sample. The evaluation is preferably based on parameters relating to the energy-dependent photopeak efficiency, the neutron flux and the neutron spectrum within the sample or within the partitions of the sample. Consequently, a very comprehensive analysis can be implemented on the basis of the three input parameters of form/geometry and mass of the sample body and also neutron source strength, with the three calculated parameters of energy-dependent photopeak efficiencies, neutron flux and neutron spectrum within the sample and within the partitions of the sample being taken into account. These parameters are influenced by the elemental composition of the sample, and so the method is preferably carried out iteratively until the calculated elemental composition no longer changes or no longer changes substantially. A possible manner of the iteration is described in more detail with reference to FIG. 3. An initial neutron flux and an initial neutron spectrum are calculated from the input parameters (step S1). Further, the precise type of collimation and, optionally, the partitioning of the sample can additionally be taken into account/determined and, further, a translation and/or rotation of the sample that is advantageous for the measurement procedure can also be taken into account (step S2). The type of collimation and the partitioning of the sample can be made dependent on, in particular, the size and geometry of the sample. Larger samples and more complex geometries are subdivided into more partitions than small samples. The evaluation of the recorded gamma spectrum comprises the identification of the elements contained in the sample by assigning the measured peaks in the spectrum to individual elements, taking account of interferences between gamma peaks. The net count rates in the individual gamma energies are preferably calculated only once and kept constant within the iterative method (step S3). An initial elemental composition of the sample is calculated therefrom. The elemental composition of the sample is determined by applying the steps, yet to be described below, for calculating the photopeak efficiencies (step S4), the elemental masses in the individual partitions of the sample (step S5) and the neutron flux and the neutron spectrum (step S6). This process is carried out iteratively until the elemental composition in the individual partitions no longer changes. A high accuracy is obtained as a result of the iterative analytic procedure.

The net count rates of the individual gamma energies are, in particular, only calculated once and kept constant during the iterative method. An initial assumption about the elementary composition of the sample is made at the outset. Then, a new elemental composition of the partition is determined applying the methods, described in the preceding paragraphs, for calculating the photopeak efficiencies, the neutron flux and the neutron spectrum and the elemental masses in individual partitions of the sample. This process can be carried out iteratively until the elemental composition in the individual partitions no longer changes.

The nondestructive method for multielement analysis on the basis of neutron activation, described here, can be carried out in automated or fully automated fashion for the first time as a result of this analytic procedure, in particular even over a relatively long duration, in particular in the case of large-volume samples, in particular already above approximately 1 liter. Only the form of the sample body and the mass are required as input parameters, the neutron source strength being taken into account during the calculation. Here, the neutron source strength is ascertained from the operational parameters of the neutron generator or from the activity of the neutron source. For an elemental analysis of large-volume samples, too, the respective sample is continuously irradiated by neutrons and the gamma radiation emitted by the sample and the quantity of an element contained in the sample are measured and, following the subtraction of the background signal, said element is evaluated from the area of the photopeak caused by the element, in particular in a count rate-energy diagram. In contrast to previous methods, irradiation can be carried out continuously and measurements can be carried out concurrently, with neither pulsed irradiation nor interruptions in the measurement time being required. Additionally, the composition of the sample being known for at least a portion of the sample is no longer required for determining the neutron flux at the location of the sample. For large-volume samples in particular, there can also be a transmission measurement for characterizing the sample.

Here, fast neutrons should be understood to mean neutrons that are fast when they are emitted by the source and are thereupon decelerated by a sample chamber and/or by a moderation chamber, in particular in order to be able to increase the probability of an interaction with the sample. Neutrons decelerated by means of moderator materials can be referred to as thermalized neutrons. Thermalized neutrons are slow or decelerated free neutrons, in particular with a kinetic energy of less than 100 meV (millielectronvolt). In a classification of neutron, thermalized neutrons or thermal neutrons lie between cold neutrons and fast neutrons. The term "thermalized" indicates that the neutrons, as a result of repeated scattering in a medium, come into equilibrium with the thermal motion of the latter. Here, the speeds of these thermalized neutrons adopt a corresponding Maxwell distribution, which can be described by a temperature.

According to one embodiment, the irradiation or the irradiation and measurement is implemented over a period of time of at least one millisecond or at least one second. According to one embodiment, the measurement of radiation emitted in reaction to the irradiation is implemented during the irradiation in a time window of less than 5 microseconds (μs).

According to one embodiment, the irradiation is implemented over a period of time of at least 10 minutes or at least 30 minutes or at least two hours, without interruption. An optimal irradiation duration is defined depending on the respective specific analysis problem. The continuous irradiation over such periods of time facilitates a reliable evaluation of the measurement data in flexible fashion, in particular also in a targeted fashion in respect of individual partial aspects. In particular, the irradiation duration can be defined in view of a required sensitivity of the analysis problem. It was found that the probability of detecting trace contaminations (trace amounts of contamination) increases with increasing irradiation duration. The sensitivity of the measurement method according to the invention can be increased with increasing time. Irradiation duration and iterations can be defined independently of one another in this case.

An irradiation duration in the range of seconds can be defined as a minimum irradiation duration. An irradiation duration in the range of seconds, minutes, hours or even days can be defined as the maximum irradiation duration.

According to one embodiment, neutrons are generated with a neutron energy value of 2.45 MeV or with at least one neutron energy value from the following group: 2.45 MeV, 14.1 MeV. It was found that a particularly good signal, i.e., a signal with an advantageous SNR, can be obtained in the case of neutrons at 2.45 MeV.

According to one embodiment, neutrons are generated with a neutron energy with at least one value in the energy range of 10 keV to 20 MeV, in particular 10 keV to 10 MeV.

According to one embodiment, neutrons are generated with a neutron energy of no more than 10 MeV. In particular, this provides a high sensitivity. An advantage of the continuous irradiation with a neutron energy that is less than or equal to 10 MeV, in particular with a neutron energy of 2.45 MeV, was found to be that many inelastic interactions, as threshold reactions which require neutron energies of at least 3 to 4 MeV, do not occur in this case. Such inelastic interactions cause a deterioration in the SNR. By virtue of the energy of the neutron source now being kept as low as possible, it is possible to avoid such inelastic interactions below the chosen neutron energy. According to one of the possible variants of the method, exclusive use is made of a neutron energy of 2.45 MeV.

According to the invention, at least prompt or both prompt and delayed gamma radiation from continuous neutron irradiation is measured and evaluated for the purposes of determining at least one element. Evaluating both types of gamma radiation extends the analysis options and increases the flexibility of the method. It was found to be expedient to evaluate the following reaction of an irradiated atomic nucleus, without having to take account of a time dependence of any neutron pulse: gamma radiation at different energies is emitted automatically as soon as an atomic nucleus captures a neutron. The atomic nucleus de-excites by emitting a cascade of gamma emissions. The gamma radiation generated thereby is characteristic for a respective element.

According to one embodiment, only delayed gamma radiation is measured and evaluated, at least intermittently, in reaction to continuous neutron irradiation in order to determine the at least one element. This allows the emphasis of the examination to be focused on certain aspects, e.g., in the case of a sample with a specific material.

According to one embodiment, for the purposes of determining the at least one element, the gamma radiation emitted by the sample is measured in energy-resolved fashion, in particular by determining photopeak count rates, wherein the determination comprises an energy-resolved evaluation of the measured gamma radiation in accordance with at least one gamma spectrum, in particular in accordance with a gamma spectrum detected by a respective detector. Here, the same detector can be used both for prompt gamma radiation and for delayed gamma radiation. The energy-resolved analysis facilitates flexibility and robustness. This also allows a parallel analysis of virtually all elements using one measurement.

The measured gamma spectrum is specific to a detector. The respective detector can have a specific resolution, in each case for a specific gamma spectrum.

According to one embodiment, the measurement/evaluation comprises an energy-resolved measurement/evaluation of the intensity of the gamma radiation emitted by the sample. This provides high flexibility and robustness, particularly in conjunction with the evaluation of a plurality of types of gamma radiation.

According to one embodiment, the determination comprises an evaluation of the measured gamma radiation, wherein the evaluation comprises: correlating, on the basis of its energy, at least one photopeak in the count rate-energy diagram with an element of the sample. This provides a comprehensive analysis both in view of prompt and delayed radiation, in particular for, in each case, a gamma spectrum measured by one of a plurality of detectors.

Here, the detected photopeak can be a photopeak characterizing prompt or delayed gamma radiation. During the evaluation, prompt and delayed gamma radiation can be distinguished on the basis of the respective energies, in particular also in the case of photopeak where two gamma energies interfere. A distinction between prompt and delayed peaks remains independent of such interferences. For both types of gamma radiation, a respective photopeak efficiency can be determined in spatially resolved and energy-resolved fashion in this case by way of a numerical method, in which the interactions are mapped from the location of the emission in the sample (source point) to the absorption in the detector.

According to one embodiment, the evaluation comprises: quantifying the mass fraction of at least one element of the sample, in particular by virtue of the component of at least one element contained in the sample being evaluated after subtracting a background signal from the net area of a/the photopeak, which is caused by the element in a count rate-energy diagram.

To this end, the photopeak can be fitted in the spectrum. The area under the photopeak can be defined as background/background signal and the net photopeak area can be defined as used signal.

According to one embodiment, the sample, in particular individual partitions of the sample, is/are measured in collimated fashion, in particular by means of at least one detector or by means of a plurality of detectors with a field of view specifically collimated with respect to the geometry of the partition. This can increase the accuracy and also facilitates focusing on portions of the sample, particularly in the case of a good SNR. Advantages in respect of the measurement time, in particular, arise in the case of two or more detectors. It was found that the measurement time in the method described here can be chosen to be ever shorter the more detectors are provided and/or that the sensitivity of the measurement can be increased for the same measurement time.

According to the invention, the sample is subdivided into partitions and the emitted gamma radiation is measured and evaluated in respect of a respective partition using a collimator. According to one embodiment, the measurement, determination and/or evaluation is implemented on an individual basis in respect of the individual partitions of the sample, said partitions being predefined or predeterminable manually or automatically, in particular by way of collimation. This facilitates focusing on individual regions of the sample or simplifies the evaluation of large-volume samples or samples with an inhomogeneous composition.

The partitioning simplifies the analysis, in particular in respect of a desired exactness of the evaluation. The partitioning can facilitate a spatially resolved elemental composition in the respective partitions as a result. Partitioning also provides the advantage of being able to make assumptions more easily or with less error. By way of example, eight or more partitions, in particular 12 partitions, are formed in the case of a cylindrical sample body, in each case as a cylinder segment (cake slice). The detector unit then comprises, e.g., two detectors that are disposed not opposite one another but offset from one another at an angle (circumferential angle less than 180°, e.g., circumferential angle of 130 to 150°). The entire sample can then be analyzed over the entire circumference by way of incremental rotation, in particular in 60° steps, e.g., in six steps when use is made of two detectors and when 12 partitions are defined.

It was found that a relationship or a dependency between collimation and partitioning can be used in this case. In particular, the collimation can be implemented as a function of the selected partitioning. A control device of the apparatus can be configured to predetermine the collimation as a function of the selected partitioning. Here, the following relationship can be predetermined between collimation and partitioning: the entire partition preferably lies in the collimated field of view of the detector. Here, the collimated field of view of the detector only has the smallest possible spatial component of other partitions, i.e., of partitions not equal to the target position on which collimation is focused. The field of view can be primarily restricted to the target position as a result of the optionally adjustable geometry of the collimator.

It was found that a collimation can particularly effectively attenuate the background signal. Here, a collimated measurement should be understood to mean, in particular, a detection of the gamma radiation by at least one detector with a collimated field of view. It was found that the method described here can be carried out continuously over a relatively long period of time with a particularly advantageous SNR, also thanks to the collimation.

According to one embodiment, the determination comprises an evaluation of the measured gamma radiation, wherein the evaluation is implemented on the basis of the assumption of a homogeneous mass and/or element distribution in the sample, in particular a homogeneous mass and/or element distribution in at least one of a plurality of partitions of the sample. This provides a robust method, particularly in the case of an iterative method that is automated to a high degree.

The element and mass distribution can be assumed homogeneous at least in a respective partition, and so the respective partition can be calculated/evaluated uniformly. Here, the measurement accuracy can also be increased by virtue of the partitions being chosen geometrically in such a way that the assumption of a homogeneous mass distribution applies to the best possible start extent, i.e., for example, no cake slices in place of layers above one another in the height direction.

In contrast thereto, the previous methods often use the analytic approach of the elements being point sources. In respect of the configuration of the element distribution, one of two initial assumptions can be made: either a point source or a homogeneous element and mass distribution in a partition. It was found that the assumption of a homogeneous element and mass distribution in conjunction with the method described herein leads to a very robust measurement with minimized uncertainty.

According to the invention, the determination comprises an evaluation of the measured gamma radiation, wherein the evaluation comprises: a spatially resolved and energy resolved calculation of neutron flux within the respective partition of the sample, in particular on the basis of a diffusion approximation of the linear Boltzmann equation, in particular on the basis of the following relationship:

$$\Phi(x,E_n)=\int_{S^2}\Psi(x,E_n,\Omega)d\Omega.$$

This also supplies a straightforward type of calculation, which provides advantages particularly in the case of iterations, in conjunction with the aforementioned advantages.

According to one embodiment, the evaluation also comprises a calculation of the neutron spectrum within the sample, in particular within a respective partition of the sample, in particular in spatially resolved and/or energy-resolved fashion, in particular on the basis of the following relationship:

$$\Phi(x,E_n)=\int_{S^2}\Psi(x,E_n,\Omega)d\Omega.$$

This supplies robustness in conjunction with the aforementioned advantages.

According to one embodiment, the determination comprises an evaluation of the measured gamma radiation, when the evaluation comprises: calculating energy-dependent photopeak efficiencies and neutron flux and neutron spectrum within the sample or within an individual partition of the sample, in particular by calculating neutron flux and neutron spectrum by way of an approximation method, in each case on the basis of the following relationship:

$$\Phi(x,E_n)=\int_{S^2}\Psi(x,E_n,\Omega)d\Omega.$$

This provides the aforementioned advantages. It was found that the energy-dependent photopeak efficiencies, the neutron flux and the energy-resolved neutron spectrum within the sample or within the individual partitions of the sample provide a robust basis for the evaluation. Here, the input parameters can be calculated from the neutron flux and the neutron spectrum in the empty sample chamber and/or from the neutron flux outside of the sample detected by measurement.

It was found that a diffusion approximation facilitates, in particular, a calculation on the basis of a small number of independent variables. This can also reduce the complexity of the analysis. A very accurate alternative method could consist in a numerical solution to the full linear Boltzmann equation, either in deterministic fashion or by means of a Monte Carlo method. However, the computational outlay for both variants would be very high; particularly in the case of iterations, a computation time in the range of hours or even days must be expected. A diffusion approximation provides a simple mathematical structure, allowing the application of simple numerical methods.

According to one embodiment, the determination comprises an evaluation of the measured gamma radiation, wherein the evaluation is implemented, at least in part, in relation to the measured photopeak areas by virtue of a plurality of photopeak areas, which are generated from a plurality of gamma energies, in each case of at least one element in a respective partition of the sample, being analyzed when quantifying the mass fraction of a respective element in the respective partition, said analysis being based on the following relationship (respectively for N or K partitions, wherein the index K runs over the partitions):

$$(P_R)_{E_\gamma}^i = \frac{N_A}{M} \cdot \sum_{k=1}^{K} m_k \cdot \varepsilon_{E_\gamma}^{i \leftarrow k} \cdot \sigma_{E_\gamma}^{ik} \cdot \Phi_k^i.$$

Expressed differently, a plurality of gamma energies, in each case from at least one element in a respective partition of the sample, can be analyzed during the evaluation when quantifying the mass fraction of the respective element. This provides a straightforward, robust, flexible method with good accuracy. A high quality of the measurement/evaluation can be ensured.

Previously, the neutron flux in the sample could be determined by virtue of energy-dependent correction factors being determined in integral fashion for the entire sample. For large-volume samples in particular, it was found that an approximate method can also be applied in order to determine the neutron flux without energy dependence and for specific geometries that allow a reduction to two spatial dimensions. In particular, such a method is based on a diffusion equation that is determined by two parameters only. In particular, it is possible to apply aspects of a method, the relationships of which were already considered in detail in the following publication: R. Overwater, The Physics of Big Sample Instrumental Neutron Activation Analysis, Dissertation, Delft University of Technology, Delft University Press, ISBN 90-407-1048-1 (1994).

In contrast thereto, the neutron flux and the neutron spectrum within the sample or the individual partitions of the sample could be determined according to the present invention by a computer program, wherein a diffusion approximation of the linear Boltzmann equation can be numerically solved in spatially resolved and energy-resolved fashion, in particular with all three spatial dimensions being taken into account. The boundary conditions for this system of equations can be calculated from simulation calculations of the neutron flux in the empty sample chamber and/or from the neutron flux outside of the sample detected by measurement. Energy-dependent correction factors are not required or need not be defined.

The calculation and evaluation of the neutron flux and neutron spectrum can be implemented individually in each case for a respective partition, in particular by virtue of the respective partition being defined on the basis of a virtual subdivision of the sample into spatial regions.

According to one embodiment, the method is carried out on the basis of the input variables of neutron source strength, sample geometry and sample mass, in particular exclusively on the basis of said three input variables. As a result of this, the method can be automated to a high degree. Then, only three input parameters have to be predetermined. Further parameters can be ascertained numerically/in automated fashion. As a result of this, it is also possible to minimize the outlay on part of the user. Further input parameters can be provided, for example, by nuclear physics data or by the simulated calculation of the input parameters for the calculation of neutron flux and neutron spectrum.

Optionally, a monitor, or a calibration material with a predetermined composition, can be analyzed together with the sample. This can increase the measurement accuracy or the robustness of the measurement, particularly in the case of samples whose composition is unknown or in the case of samples in which relatively uncertain assumptions are made. However, the use of a monitor and the evaluation of the gamma radiation emitted by the monitor can be implemented optionally, independently of the aspects of the method and the apparatus described herein. In particular, use can be made of a material that does not occur in the sample with a high degree of certainty, for example gold in the form of a very thin gold foil that is placed on the sample.

According to one embodiment, the method is carried out in automated fashion, in particular by evaluating the measured gamma radiation on the basis of purely numerically ascertained parameters apart from the three parameters of neutron source strength during the irradiation, sample geometry and sample mass. This provides independence and the option of carrying out iterations in a simple fashion. The method becomes more robust. Here, a neutron flux can also be detected by means of neutron detectors outside of the sample.

Optionally, automation can also be implemented in respect of the three aforementioned parameters. The sample geometry can be detected independently by a camera unit, and the sample mass can be detected by a weighing unit. Both camera unit and weighing unit components are preferably positioned not in the interior of the apparatus, i.e., not within the neutron field, but outside of the sample chamber, in particular outside of the shielding. To this end, the apparatus may have a measuring space for specifying the sample, it being possible to characterize the sample in automated fashion at said measuring space. The neutron source strength can be obtained directly as a controlled variable from the neutron generator. The neutron source strength depends directly on the high voltage and current of the neutron generator. As a result of this extension of the automation, a very independent and user-friendly apparatus or measuring installation can be provided.

According to one embodiment, at least one measurement of the following group of measurements is carried out for characterizing the sample: transmission measurement, sample weighing, optical detection of the sample geometry. This firstly simplifies the handling of the measurement method for the user and secondly also simplifies the subsequent measurement, in particular in respect of a partitioning, too.

According to one embodiment, the method is carried out iteratively, in each case with respect to individual elements or with respect to the complete composition of the sample or with respect to the individual partitions of the sample and/or with respect to the complete composition of the sample, in particular. This provides good accuracy, particularly in the case of a method that is easy to handle. This also provides a method with a high degree of independence.

According to one embodiment, the spatially resolved and energy-resolved determination of the neutron flux, in particular of the absolute neutron flux of a respective partition, is implemented within the sample chamber (outside of or) externally to the sample, in particular by means of at least one neutron detector disposed within the sample chamber. This also simplifies the determination of the absolute or total neutron flux, be this in addition to a determination in respect of a respective partition or be this as an alternative thereto.

The invention also relates to a method for a multielement analysis on the basis of neutron activation, including the steps of: generating fast neutrons with an energy in the range of 10 keV to 20 MeV; irradiating a sample with the neutrons; measuring the gamma radiation emitted by the irradiated sample in order to determine at least one element of the sample; wherein the sample is irradiated continuously in non-pulsed fashion, wherein the measurement is implemented during the irradiation, time-independently of the irradiation, in particular concurrently with the irradiation, wherein at least prompt or both prompt and delayed gamma radiation from continuous neutron irradiation is measured and evaluated for the purposes of determining at least one element, wherein the evaluation is implemented on the basis of the assumption of a homogeneous mass and/or element distribution within the sample or in at least one of a plurality of partitions of the sample. Numerous of the aforementioned advantages arise as a result thereof. The measurement/ evaluation can be implemented independently of the time curve of the irradiation or independently of individual phases of an irradiation.

At least one of the aforementioned objects is also achieved by the use of a detector unit comprising at least one detector in the multielement analysis of a sample on the basis of neutron activation, configured to continuously measure both prompt and delayed gamma radiation emitted on account of continuous irradiation of the sample with neutrons, wherein the gamma radiation, at least in part, is also measured continuously, i.e., independently of the time of the irradiation and independently of possible neutron pulses, in particular without a time window, and concurrently with the continuous irradiation, wherein the field of view of the detector unit is restricted to the respective partition of the sample by means of at least one collimator, in particular the use the detector unit with a plurality of detectors, in each case collimated or partition-collimated or adjustably collimatable in respect of at least one partition or in respect of at least one predefinable geometry of a partition, preferably with a collimator made of lead or bismuth. The aforementioned advantages arise as a result thereof.

The invention also relates to the use of at least one neutron source for multielement analysis of a sample on the basis of neutron activation for generating fast neutrons for continuously irradiating the sample with first neutrons with at least one neutron energy value from the following group: 2.45 MeV, 14.1 MeV; and/or with second neutrons with a neutron energy with at least one value in the energy range of 10 keV to 20 MeV, in particular 10 keV to 10 MeV; and/or with third neutrons with a neutron energy of no more than 10 MeV. The aforementioned advantages arise as a result thereof. Preferably, the emitted gamma radiation is detected by a detector with a collimator made of lead or bismuth.

At least one of the aforementioned objects is also achieved by a control device configured to actuate at least one neutron generator of an apparatus for multielement analysis on the basis of neutron activation, in particular an apparatus as described herein, wherein the neutron generator is configured to generate fast neutrons with energy in the range of 10 keV to 20 MeV, in particular 10 keV to 10 MeV, wherein the control device is configured to actuate the neutron generator to generate neutrons and to irradiate a sample in non-pulsed, continuous fashion, in particular during at least one first time window, and wherein the control device is further configured to actuate at least one detector for the continuous and/or intermittent measurement of gamma radiation emitted by the sample or a single partition of the sample, concurrently with the irradiation, in particular during at least one second time window independently of the first time window, continuously concurrently with the continuous irradiation and/or time-independently thereof. The first and second time window can be different or can be set or predefined independently of one another. The control device is further configured to restrict the field of view of the detector to the respective partition of the sample by means of at least one collimator. In particular, the control device is configured to control an above-described method.

This type of analysis provides aforementioned advantages. Here, the control device can synchronize at least the irradiation and measurement and optionally synchronize the positioning of the sample (in particular by activating/regulating the rotation/lifting device), too, and consequently said control device can control the actual measurement method of the measuring installation, in particular the manner of data acquisition and the period of time therefor. The irradiation and measurement can be implemented by means of this control device, in particular over a period of time of, e.g., at least 20 or 50 s, or else over a plurality of hours or days. The control device can be coupled to a rotation/lifting device and can further be configured to position a sample, disposed on a sample carrier, by means of the rotation/lifting device, in particular as per, or depending on, the geometry of partitions of the sample. Not least, this offers the possibility of using a single control device to actuate the entire apparatus or allow the entire method to run (three function control device), comprising the actuation of the neutron generator, actuation of the at least one detector, and positioning of the sample. Here, parameters such as, e.g., the neutron source strength can be predetermined for the neutron generator and position data or displacement travel and displacement speeds can be predetermined for the rotation/ lifting device.

The control device can be configured to control the operation of a neutron generator configured to fuse deuterons for the purposes of generating fast neutrons for the multielement analysis of a sample by way of continuous, non-pulsed irradiation of said sample.

The apparatus or the control device may comprise an input mask (user interface) or input unit for the manual entry of the following three parameters: neutron source strength during the irradiation, sample geometry and sample mass. These parameters may also be stored in a data memory and may be read by the control device and transferred to a computer program product.

At least one of the aforementioned objects is also achieved by a computer program product for multielement analysis on the basis of neutron activation, and configured to determine at least one element of a sample, irradiated in non-pulsed continuous fashion with neutrons, by evaluating gamma radiation emitted by the sample, specifically prompt and/or delayed gamma radiation, on the basis of energy-dependent photopeak efficiencies and neutron flux and neutron spectrum within the sample or within a single partition of the sample, and further configured to evaluate gamma radiation measured in partition-collimated fashion by virtue of a plurality of gamma energies, respectively of the at least one element, being analyzed in the respective partition of the sample when quantifying the mass fraction of the respective element of the respective partition on the basis of the net photopeak count rate registered during the multielement analysis, in particular on the basis of the following relationship:

$$(P_R)^i_{E_\gamma} = \frac{N_A}{M} \cdot \sum_{k=1}^{K} m_k \cdot \varepsilon^{i \leftarrow k}_{E_\gamma} \cdot \sigma^{ik}_{E_\gamma} \cdot \Phi^i_k.$$

Here, this system of formulas relates to the determination of elemental masses according to the invention in the individual partitions (evaluation of the formulas for all masses of the individual partitions, in particular simultaneously). This computer program product facilitates a high degree of automation or independence, in conjunction with a high accuracy of the analysis. In particular, the computer program product is configured to carry out an above-described type of the evaluation in automated fashion. Here, a particle-collimated evaluation should be understood to mean an evaluation that is individual in respect of individual partitions of the sample, said partitions having been defined geometrically in advance and being delimited from one another.

Additionally, the computer program product can also be configured to predetermine an intended position of the sample, in particular as a function of a detected or entered sample geometry, in particular on the basis of intended positions, stored in a position database, as a function of the sample geometry and/or sample size, wherein the positioning can be implemented, in particular, by actuating/regulating a rotation/lifting device.

The computer program product can be configured to calculate various variants of a partitioning for a respective sample geometry and propose a partitioning identified as optimal or directly select the latter autonomously. To this end, the computer program product can carry out an approximate uncertainty analysis as a function of the number and configuration of the partitions and can set the partitioning depending on accuracy required by the user or determine this autonomously. In this procedure, a configurable collimator can be set specifically in relation to the selected partitions.

The invention also relates to a data medium with such a computer program product stored thereon, or a computer or a computer system or a virtual machine or at least one hardware element therewith.

The invention also relates to a computer program configured to provide the manner of evaluation described herein or to provide the method steps in this respect described herein.

According to one exemplary embodiment, the computer program product is configured to evaluate an integral measurement, in particular in respect of a non-partitioned sample on the basis of a single gamma spectrum, in particular on the basis of the following relationship:

$$(P_R)_{E_\gamma} = \frac{m \cdot \varepsilon_{E_\gamma} \cdot N_A \cdot \sigma_{E_\gamma} \cdot \Phi}{M}.$$

This provides a simplification in respect of the assumption of a homogeneous mass distribution.

The method according to the invention can also be described as set forth below. In a method for nondestructive element analysis of samples, the respective sample is continuously irradiated by fast neutrons, wherein, concurrently with the irradiation, the gamma radiation emitted by the sample is measured, wherein the amount of an element contained in the sample is evaluated from the net area of the photopeak, following the subtraction of the background signal, which the element causes in a count rate-energy diagram. Here, the quantification of the elemental masses of a sample can progress in automated fashion and the parameters required for the analysis, apart from the neutron source strength during the irradiation and the geometry and overall mass of the sample, can be calculated numerically. Here, there is no need for a monitor for the neutron flux or a sample-internal or external calibration standard. Here, the sample can be decomposed into spatial regions (partitions) and each partition of the sample can be measured in collimated fashion. Here, the determination of the element masses of the sample can be based on the element distribution and mass distribution in the individual partitions of the sample being assumed to be homogeneous. Here, the mean density of a partition can emerge from a transmission measurement using a radioactive gamma emitter. Here, the neutron flux within the partitions of the sample can be determined by an analytic method which numerically solves a diffusion approximation of the linear Boltzmann equation and which calculates boundary conditions for this system of equations from simulation calculations of the neutron flux in the empty sample chamber and/or the neutron flux outside of the sample detected by measurement. Here, the photopeak efficiencies can be determined in spatially resolved and energy-resolved fashion by a numerical method, in which the interactions are mapped from the emission in the sample (source point) to the absorption in the detector. Here, the method can be carried out iteratively in respect of the composition of the sample until the calculated composition of the sample stabilizes. Here, all detected photopeak areas, which are generated by various gamma emissions of an element in the sample, can be taken into account in the analytic evaluation. Here, the results of the measurement of each partition can be taken into account during the analytic evaluation, as a result of which there can be improvement in the sensitivity and accuracy of the measurement method for the entire sample. Here, the neutron source and the sample can be situated in a sample chamber, embodied as a moderation chamber, made of graphite. In the process, effective shielding from neutron radiation can be situated directly around a/the moderation chamber or around the sample chamber. Here, the detector or the detector unit can be situated in a collimator made of material that shields gamma rays. Here, the geometry of the sample and moderation chamber and/or of the sample carrier can reduce the neutron flux gradient within the sample, which can be obtained, in particular, by means of changeable moderation lengths (path length between neutron source/neutron source point and sample), with the effect of the neutron flux gradient being reduced or modified.

At least one of the aforementioned objects is also achieved by an apparatus configured to carry out a multi-element analysis on the basis of neutron activation, comprising:

a neutron generator configured to generate fast neutrons;

a sample chamber and a sample holder disposed therein;

a detector unit comprising at least one detector configured to measure gamma radiation emitted by an irradiated sample, for the purposes of determining at least one element of the sample; wherein the apparatus is configured to irradiate a/the sample, disposed on the sample carrier, in non-pulsed continuous fashion and configured to measure prompt and/or delayed gamma radiation emitted by the irradiated sample time-independently of the irradiation, in particular without a time window, during the irradiation, in particular concurrently with the continuous irradiation, in particular configured to carry out an above-described method. As a result, aforementioned advantages arise, in particular in conjunction with a low background signal or background signal that has been minimized by apparatus and/or method technology.

Here, the apparatus comprises at least one collimator that restricts the field of view of the detector to a respective partition of the sample and is configured to subdivide the sample into individual partitions, and further configured to measure at least prompt or both prompt and delayed gamma radiation, emitted by the continuously irradiated sample, in respect of a respective partition of the sample during the irradiation. The apparatus further comprises: a control device configured to carry out automated continuous irradiation and configured to control/regulate an automated measurement of continuously applied neutron irradiation during the irradiation. The apparatus is further configured to determine the neutron flux within the respective partition of the sample in spatially resolved and energy-resolved fashion and configured to evaluate the measurements of the partitions by quantifying the mass fraction of the at least one element of the sample. This also simplifies automation.

Preferably, a semiconductor or scintillation detector is used as an individual detector (of a detector unit), i.e., a detector with a high energy resolution, which is configured to measure the prompt and delayed gamma radiation.

Optionally, the method is varied by means of a moderation chamber that is provided independently of the sample chamber. As a standard, the moderation chamber can be provided/installed in the apparatus fixed in space. The process of moderation can be carried out as desired in the sample chamber, in the moderation chamber and/or in the sample itself.

The respective detectors of the apparatus can be focused by at least one collimator. A collimator configured to predetermine or delimit or set the field of view of the detector in particular provides the advantage of an improved SNR, specifically also in conjunction with continuous irradiation. Moreover, the sample can be measured in partition-collimated fashion.

Preferably, a plurality of detectors are disposed at the same height level, in particular at the height level of the neutron source or of the neutron source point. Preferably, the detector or detectors are disposed as close as possible to the neutron source point. This provides good measurement results or facilitates the minimization of background signals. In a plan view in the case of an arrangement at the same height level, the detectors are preferably offset relative to the neutron source point by less than 90° in the circumferential direction, for example by 60 or 75°.

Here, the neutron source point should preferably be understood to mean the location or position at which the neutrons are emitted, in particular emitted into the sample chamber toward the sample. The neutron generator can be disposed independently of the position of the neutron source point, or else predetermine the position of the neutron source point.

Like a/the moderation chamber, the collimator can be securely installed in a single predefined setting or configuration. Optionally, the collimator may also have a plurality of settings, respectively for a predeterminable field of view, e.g., a first setting with a relatively wide/broad field of view, a second setting with a mid field of view and a third setting with a relatively narrow/tight/focused field of view, wherein the collimator may be switchable between the settings.

Here, the apparatus comprises at least one component that attenuates a background signal of the apparatus, said component being selected from the following group: at least one collimator, preferably a collimator made of lead or bismuth, said collimator restricting the field of view of the (respective) detector to a partition of the sample. The apparatus may further comprise: a moderation chamber made of graphite, and/or a shielding made of borated polyethylene, and/or a sample chamber and/or a sample carrier, each at least partly made of graphite or completely fluorinated plastics or beryllium. In particular, an improved SNR can be obtained as a result thereof. The collimator preferably has a wall strength of at least 5 cm. The apparatus can analyze the sample in nondestructive fashion and, in the process, evaluate the emitted gamma radiation in respect of numerous aspects. The apparatus is not restricted to the evaluation of a specific type of gamma radiation or in a certain time window.

It was found that an advantageous angle between neutron generator and detector lies between 50 and 90°, in particular as this can avoid the detector being exposed to a neutron flux that is too high. Moreover, the detector in this angle range can be focused onto a spatial region in which the neutron flux in the sample is maximally high where possible.

Previously, gamma radiation from inelastic interactions (scattering processes) in previously employed installations generated such a strong background signal that the detection of the gamma radiation was only possible after a certain waiting time (time window) following a neutron pulse. Previously used detectors or the detectors in previously used installations were previously virtually "blind" following a respective neutron pulse. The signal rate that was too high led to the detector being paralyzed. Then, the detector required a certain waiting time in each case before a detection could be implemented again, i.e., until the signal rate dropped again.

According to one exemplary embodiment, the apparatus further comprises a computer program product or a data memory therewith, wherein the computer program product is configured to determine at least one element of the sample by evaluating the measured gamma radiation on the basis of energy-dependent photopeak efficiencies and a neutron flux and neutron spectrum within the sample or within an individual partition of the sample, in particular on the basis of at least one of the relationships already described previously in respect of the computer program product. These formulas or relationships can each be stored as one of a plurality of calculation bases in a data memory, by means of which the computer program product interacts or which the latter accesses. In addition to great flexibility during the determination/evaluation, this also provides the option of a fully automatic, iterative multielement analysis, in particular in conjunction with a control device for controlling/regulating neutron emission, detectors and/or a rotation/lifting device.

According to one exemplary embodiment, the apparatus further comprises a rotation and/or lifting device configured to displace the sample carrier or the sample in translational and/or rotational fashion, preferably a rotation and/or lifting device that is decoupled from a/the sample chamber of the apparatus, wherein at least one electric drive of the rotation/lifting device is disposed outside of a shielding (in particular outside of a shielding made of borated polyethylene) of the apparatus. This also provides a good SNR.

According to one exemplary embodiment, the apparatus further comprises a unit for a transmission measurement, which is configured to determine the mean density of the sample or the respective partition. The transmission unit comprises a radioactive gamma emitter, in particular Eu-154 or Co-60, and a detector for measuring the attenuation of the gamma radiation after penetrating through the sample. Here, the detector for measuring the attenuation of the gamma radiation can be one of the detectors for the prompt and delayed gamma radiation, or else a detector specifically provided for this transmission measurement. The sample is not irradiated by neutrons during the transmission measurement. This facilitates the distinction between the types of gamma radiation.

According to one exemplary embodiment, the apparatus comprises at least two detectors, in particular in symmetric arrangement relative to the neutron generator and/or relative to at least one neutron source or at least one neutron source point of the apparatus. As a result thereof, the respective partition can be optimally positioned or aligned in front of a respective detector. Additionally, the partitions can be defined geometrically depending on the geometry of the sample and the sample can be aligned accordingly, e.g., rotated once over the entire circumference thereof in six rotational steps.

The translation and/or rotation can be carried out in such a way that the center of a respective partition is situated level with the detector or along the visual axis of the detector, or in such a way that the sample or partition is situated in a collimated field of view of the detector.

According to one exemplary embodiment, the apparatus further comprises a control device configured to carry out automated continuous irradiation and/or configured to control/regulate an automated measurement in the case of the continuously applied neutron irradiation, time-independently of said neutron irradiation, concurrently with the continuous irradiation, in particular configured to carry out an iterative automated evaluation of the emitted and measured gamma radiation time-independently of the neutron irradiation on the basis of parameters only ascertained numerically or read by the control device apart from the three manually or automatically predeterminable parameters of neutron source strength during the irradiation, sample geometry and sample mass. This provides the option of allowing individual steps or the else entire method to be carried out in automated fashion.

According to one exemplary embodiment, the neutron generator comprises a neutron source or a neutron source point configured to fuse deuterons (deuterium nuclei), in particular using deuterium gas as a gaseous target or gaseous fuel. It was found that a sufficiently high source strength can be ensured, even by the fusion of deuterons. The use of this energy range provides advantages during the continuous irradiation, and also during the measurement and evaluation, firstly on account of a low neutron energy and secondly in respect of a long irradiation duration. The fuel can be gaseous (instead of solid), and so it is no longer necessary to replace a solid target (solid) that was used up after a certain period of time. In particular, this simplifies the analysis over a long period of time and can ensure a high reproducibility or a high reliability of the measurement results.

According to one exemplary embodiment, the neutron generator is an electrically operated neutron generator or comprises at least one radionuclide neutron source such as, e.g., an AmBe source. A neutron generator that fuses deuterons and, as result of this fusion reaction, emits neutrons with a starting energy of 2.45 MeV is preferred. Here, pulsed irradiation may optionally also be implemented specifically at 2.45 MeV. In contrast thereto, a neutron generator for fusing tritium-deuterium (14.1 MeV) is frequently used in previous pulsed irradiation, for neutrons with exactly this energy value.

According to one exemplary embodiment, the at least one detector is a semiconductor detector or scintillation detector. This facilitates an exact evaluation of both prompt and delayed gamma radiation in a broad energy range.

The invention also relates to an apparatus for multielement analysis on the basis of neutron activation, comprising:
a neutron generator configured to generate fast neutrons;
a sample chamber and a sample holder disposed therein;
a detector unit comprising at least one detector configured to measure gamma radiation emitted by an irradiated sample, for the purposes of determining at least one element of the sample; wherein the apparatus is configured to irradiate a/the sample in non-pulsed continuous fashion and configured to measure prompt and/or delayed gamma radiation emitted by the irradiated sample, time-independently of the irradiation, during the irradiation, wherein the apparatus comprises at least one component that attenuates a background signal of the apparatus, said component being selected from the following group: at least one collimator that restricts the field of view of the detector to the sample or partition, and/or a moderation chamber made of graphite, and/or a shielding made of borated polyethylene, and/or a sample chamber and/or a sample carrier, each at least partly made of graphite or completely fluorinated plastics or beryllium, wherein the apparatus further comprises a control device configured to carry out automated continuous irradiation and/or configured to control/regulate an automated measurement in the case of continuously applied neutron irradiation, time-independently of individual phases of the neutron irradiation, during the irradiation, in particular concurrently with the continuous irradiation. Numerous of the aforementioned advantages arise as a result thereof.

As a result of using a neutron generator configured to fuse deuterons, in particular with deuterium gas as a gaseous target or gaseous fuel, for generating fast neutrons for a multielement analysis of a sample on the basis of neutron activation for continuous, non-pulsed irradiation of the sample, the aforementioned advantages can be realized.

BRIEF DESCRIPTION OF THE FIGURES

The invention will still be described in more detail in the following figures of the drawing, with reference being made to the other figures of the drawing for reference signs that are not explicitly described in a respective figure of the drawing. In detail.

DETAILED DESCRIPTION OF THE FIGURES

Figure 1:
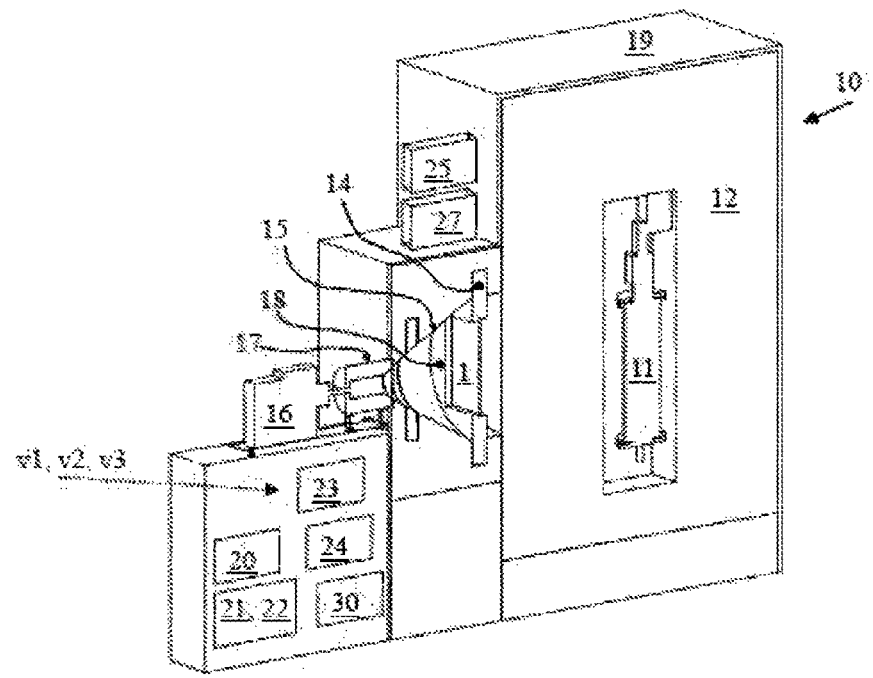
FIG. 1 shows a perspective view of a schematic illustration of an apparatus for nondestructive multielement analysis according to an exemplary embodiment.

FIG. 1 shows an assembly of an apparatus 10 for nondestructive multielement analysis, to be precise in the style of a measuring installation for carrying out the method, described herein, for multielement analysis on the basis of neutron activation.

By operating one or more neutron generators 11, a sample 1 is continuously irradiated by neutrons and the gamma radiation induced/emitted thereby is measured concurrently with the irradiation. The apparatus/measuring installation 10, including the sample 1, consists, in particular, of the following assemblies: The neutron generator 11 comprises at least one electrically operated neutron source, in particular a neutron source that fuses at least deuterium and deuterium (or deuterons) and, optionally, facilitates a further type of fusion, in particular tritium and deuterium. Fast neutrons with an energy of 2.45 MeV are emitted during the deuteron fusion reaction. Here, deuterium gas is preferably used as a target (non-radioactive). Optionally, at least one further energy value, in particular 14.1 MeV, can be provided by means of the neutron generator. The neutron generator 11 is situated within a moderation chamber 12 and surrounded by a shielding 19. The moderation chamber 12 consists of a material, preferably graphite, that moderates fast neutrons as effectively as possible and that emits as little gamma radiation as possible during the moderation process. Gamma radiation not emitted by the sample but nevertheless registered by the detector is defined as an active background signal. The apparatus 10 described herein advantageously supplies a very weak, minimized background signal, and so gamma radiation can be measured very flexibly.

During the irradiation, the sample 1 is situated on a sample carrier 14 in the interior of a sample chamber 15. By way of example, the sample carrier can be a rotary plate, a box, a can or a flask. Preferably, graphite and completely fluorinated plastics can be used as material for the sample carrier 14.

The sample carrier 14 and the sample chamber 15 are designed such that the sample is irradiated as homogeneously as possible by the neutrons (i.e., with a small local neutron flux gradient) and that neutrons that deviate from the sample are effectively reflected back into the sample. An active background signal that, where possible, is only weak should be caused during the interactions between the neutrons and the sample carrier 14 and between the neutrons and the sample chamber 15. In particular, this can be ensured by virtue of graphite, beryllium and completely fluorinated or carbon fiber reinforced plastics preferably being used as a material for the sample carrier 14 and the sample chamber 15.

The gamma spectrum measured concurrently with the irradiation is recorded by a detector unit 16 or by one or more detectors 16A, 16B. Both one detector and a plurality of detectors can be understood to mean a detector unit 16. The measurement time of a sample can be reduced by way of a plurality of detectors or the sensitivity and accuracy of the multielement analysis method can be increased in the case of an unaltered measurement time. The detector unit 16 registers the energy of the gamma radiation emitted by the sample and counts the energy depositions in the detector. A collimator 17 is situated around each detector 16. The respective collimator can be used to restrict the "field of view" of the employed detectors in such a way that predominantly gamma radiation emitted by the sample is detected. The spatial region with an elevated detection probability for gamma radiation has, in particular, the form of a cone or a pyramid proceeding from the detector. The collimator 17 is manufactured from a material, preferably lead, that shields gamma radiation as effectively as possible. Thanks to the restricted field of view of the detector, the collimator allows a minimization or attenuation of the active background signal.

Figure 5:
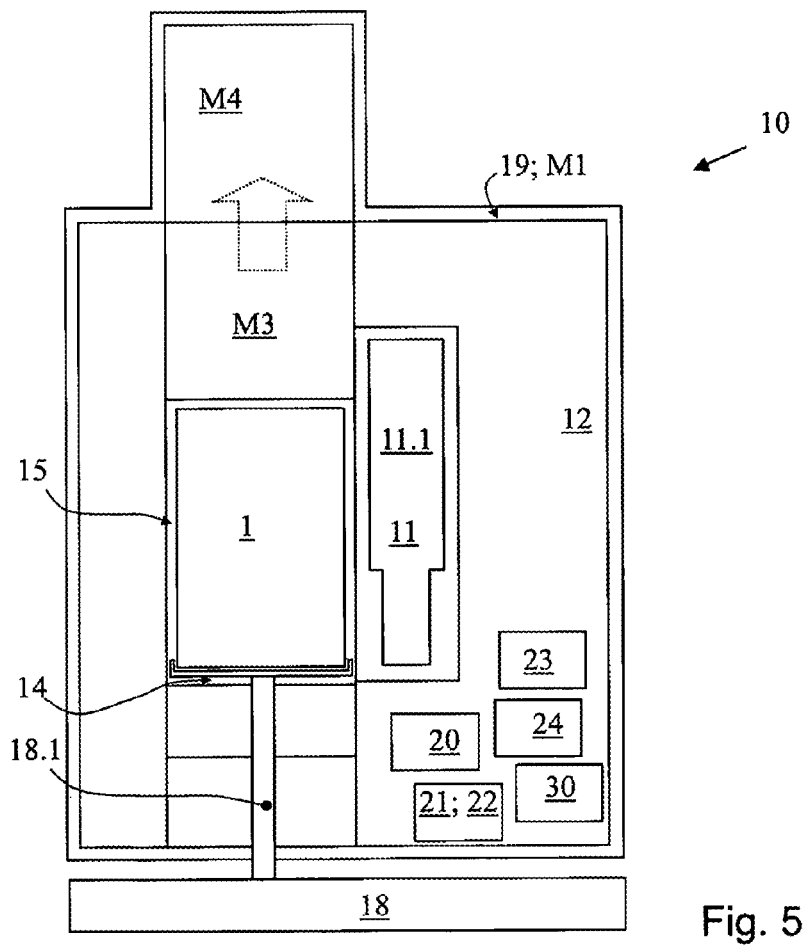
FIG. 5 shows a sectional view of a sample chamber with, disposed outside of a shielding, a rotation and lifting device of an apparatus according to one exemplary embodiment.

The sample can be measured in segmented/partitioned fashion. To this end, it is not the entire sample body but only individual segments, so-called partitions, that are situated in the collimated field of view of the detector during a single gamma-spectrometric measurement. For the purposes of positioning the individual partitions in the field of view of the detector, a rotation and lifting apparatus 18 is provided to rotate and/or translate the sample and the sample carrier. The rotation and lifting apparatus and the sample carrier are connected to one another, in particular in force-fit and/or interlocking fashion. Since the components of the rotation and lifting apparatus could increase the active background signal, these assemblies are preferably positioned outside of the sample chamber and moderation chamber 15, 12 and outside of the shielding 19 (FIG. 5). In particular, a shaft, chain or a toothed belt can be used to transfer force between the rotation and lifting apparatus and the sample carrier 14.

The shielding 19 is disposed around the moderation chamber and sample chamber 12, 15 and around the detector unit 16 and around the collimator 17. The shielding 19 surrounds the measuring installation and reduces the neutron and gamma ambient dose rate outside of the measuring installation. Preferably, borated polyethylene is used as a material for the part of the shielding that primarily shields neutron radiation. Concrete and elements with higher atomic number and higher density, for example steel or lead, can be used as materials for the part of the shielding that primarily reduces or attenuates the gamma radiation. It was found that the SNR can be significantly improved by borated polyethylene in the region of the moderation chamber and sample chamber 12, 15 and there around, and around the detector unit 16 and around the collimator 17.

FIG. 1 further indicates that at least one of at least three variables/parameters v1, v2, v3, in particular the neutron source strength, the sample geometry and/or the sample mass, can be entered or recalled at the input mask 23. According to one variant, these three parameters can also be ascertained by the apparatus 10 in fully automated fashion.

In the arrangement shown in FIG. 1, moderation can be carried out in a separate moderation chamber 12 outside of the sample chamber 15. Optionally, moderation can also be carried out within the sample chamber 15. In general, moderation can be carried out in the moderation chamber 12, the sample chamber 15 and/or in the sample 1 itself.

FIG. 1 further shows a transmission measuring unit 24, by means of which an additional characterization of the sample can optionally be carried out, in particular on the basis of gamma radiation.

FIG. 1 further indicates components for automating the measurement or evaluation, in particular a control device 20, which is coupled to a data memory 21, to a nuclear physics database 22, to an input unit/input mask 23, to a transmission measuring unit 24, to a camera unit 25, to a weighing unit 27, and/or to a computer program product 30, wherein the latter may also be stored in the control device 20.

Figure 2C:
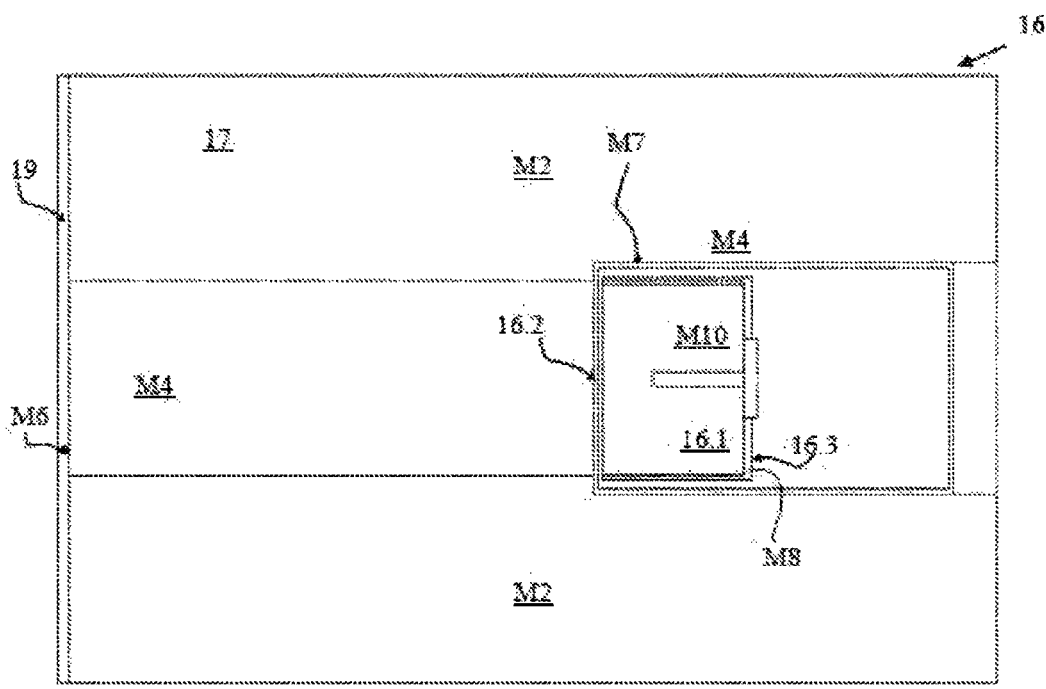
FIGS. 2A, 2B, 2C each show a sectional view of a sample chamber with one or two detectors as well as a detector in a detailed view, in each case of an apparatus for nondestructive multielement analysis according to an exemplary embodiment.
Figure 2A:
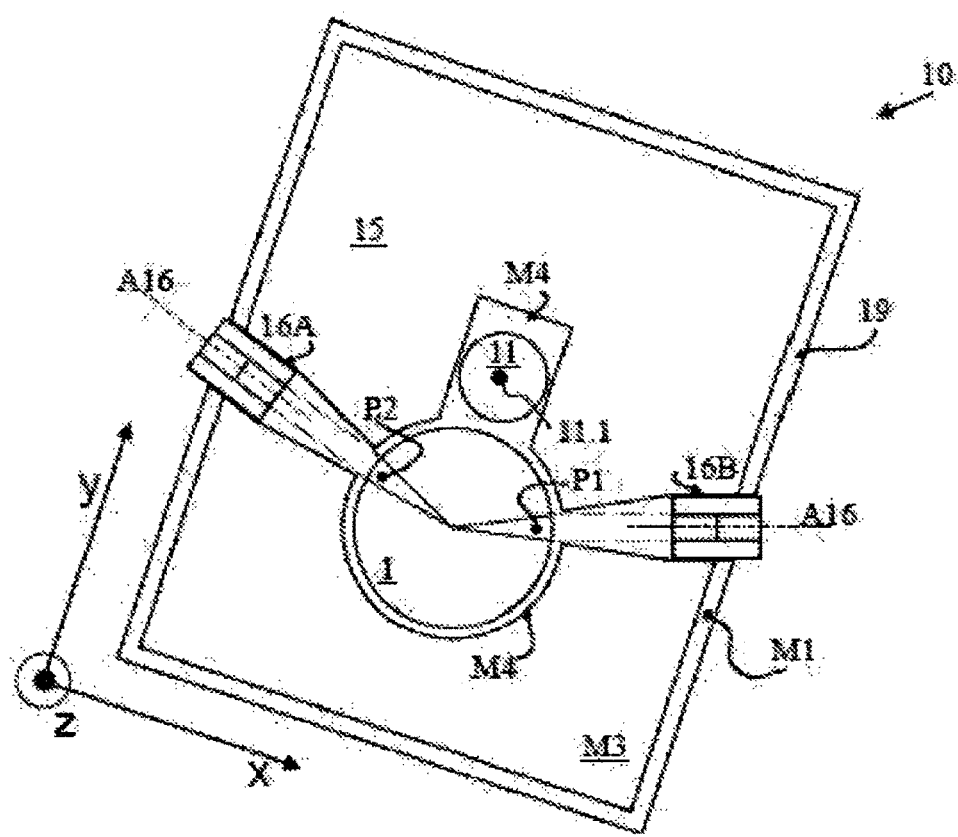
Figure 2B:
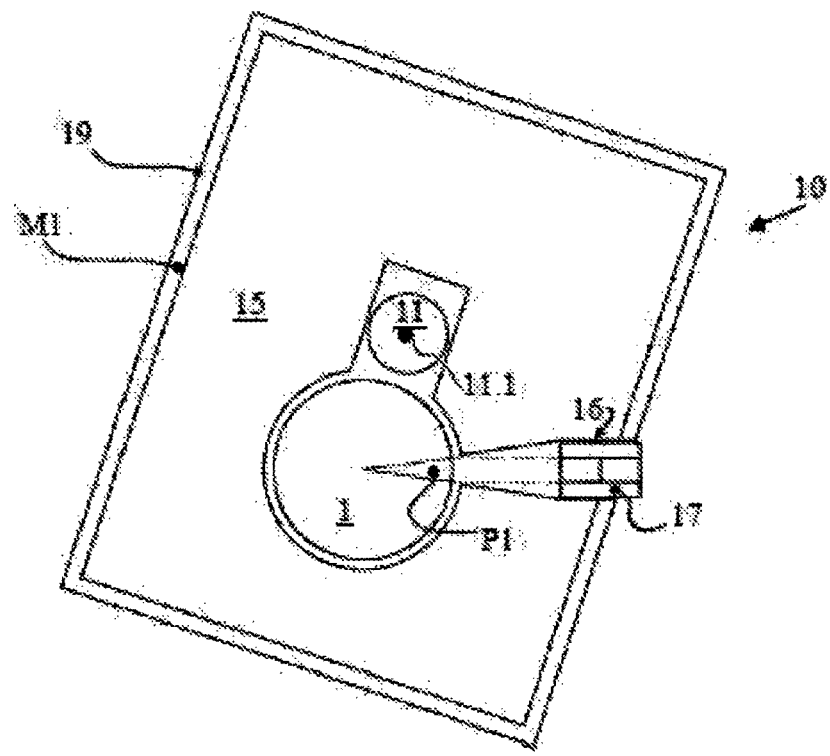

FIGS. 2A, 2B, 2C show an apparatus for nondestructive multielement analysis, by means of which there is a collimated measurement of partitions of a sample. In the variant shown in FIG. 2A, the two detectors 16A, 16B are disposed symmetrically relative to a neutron source or to a neutron source point 11.1 of the neutron generator 11.

In detail, FIGS. 2A, 2B, 2C also show the preferably employable materials, in particular materials for ensuring a weak background signal, in particular borated polyethylene M1 (in particular 5 or 10%) for the shielding 19 of neutron radiation (also concrete in sections for the shielding 19 of gamma radiation), lead or bismuth M2 for the collimator 17 or for the purposes of shielding gamma radiation, graphite M3 for the moderation chamber 12 or the sample carrier 14 or the sample chamber 15, lithium-6-polyethylene or lithium-6-silicone M6 for shielding the detector, germanium M10 for the crystal 16.1. A region between individual components of the detector 16, in particular between the detector end cap 16.2 and the crystal 16.1, is filled with air M4, in particular in the interior of the collimator. Depending on the type of neutron generator or detector, adequate materials M7, M8 can be chosen for individual further components, in particular from the list comprising copper, aluminum, plastic (in particular carbon-fiber reinforced).

FIG. 2A shows, in exemplary fashion, two partitions P1, P2 of n partitions Pn in the form of cylinder segments (cake slices) in the case of a cylindrical sample 1. Here, the sample 1 may also be provided by a drum, with a certain fill level of a fill or a fluid. The drum may have a relatively large volume, e.g., 200 liters.

FIG. 2A moreover allows identification of the alignment of the individual components as per the longitudinal axis x, the transverse axis y and the vertical axis z. The sample is cylindrical, at least in portions, or, e.g., embodied as a drum and it extends along the vertical axis z, in particular in rotationally symmetric fashion about the z-axis. Positioning at different z-levels is possible by means of the aforementioned lifting device 18.

FIG. 2B shows a variant with only one detector 16, which is collimated on a cylinder segment. This arrangement can also be provided in cost-optimized fashion, in particular.

In the arrangement respectively shown in FIGS. 2A and 2B, a moderation may also be carried out exclusively within the sample chamber 15.

FIG. 2C further shows a detector end cap 16.2 and a crystal holder 16.3, it being possible to position and align the crystal 16.1 by means of said elements.

Figure 3:
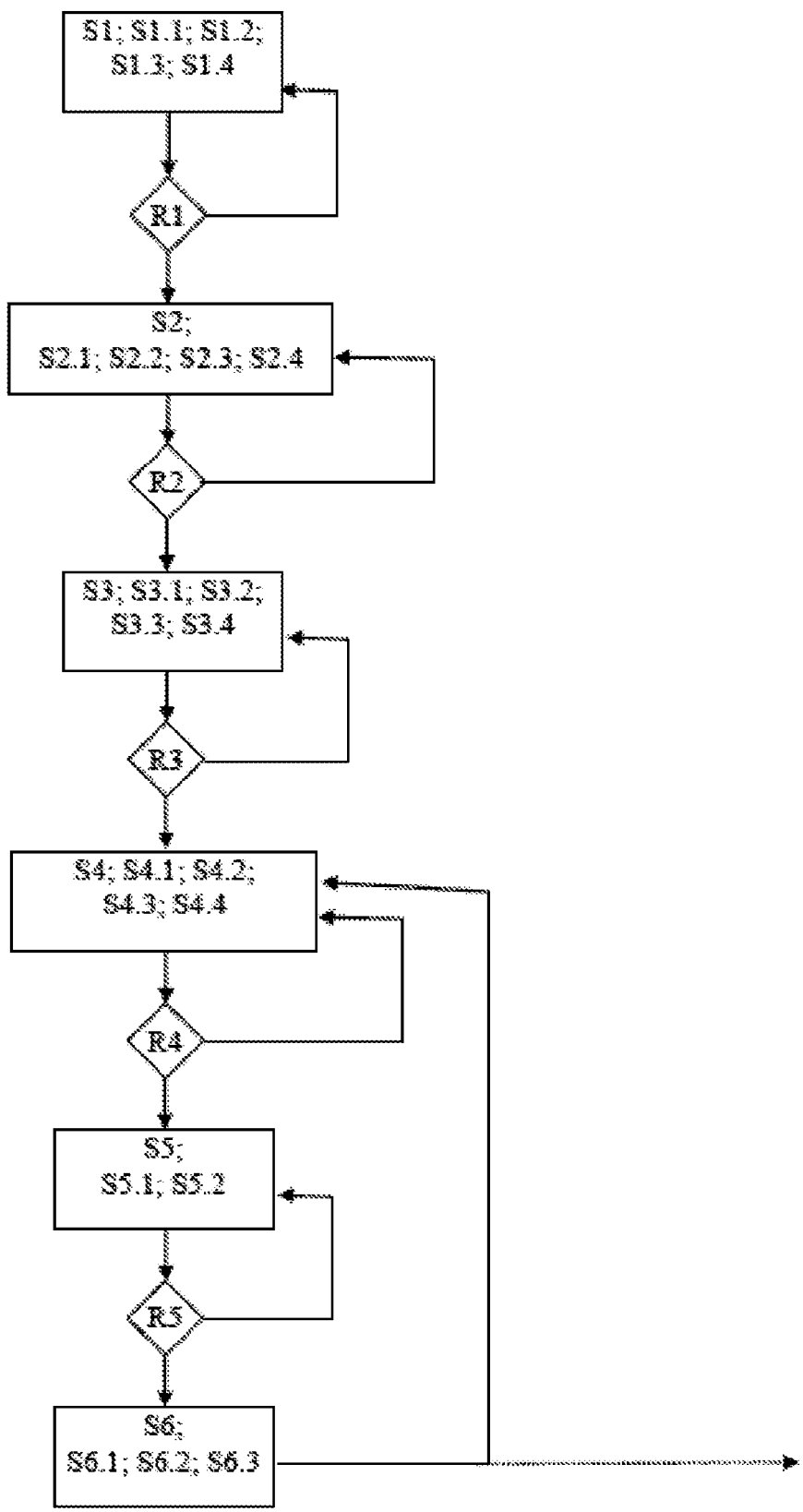
FIG. 3 shows, in a flowchart, a schematic illustration of individual steps of a method according to an embodiment.

FIG. 3 shows a method in six steps S1 to S6, said steps each comprising sub-steps. Control points R1 to R5 may be provided between the individual steps, be it for user query, be it for an automatic, computer-controlled query.

Generating neutrons and irradiating a sample with neutrons is implemented in a first step S1, wherein the first step may include at least one of the following sub-steps: setting (controlling or regulating) the neutron source strength (S1.1), moderation (S1.2), calculating the neutron spectrum by simulation (S1.3), calculating the neutron flux by simulation (S1.4). There can be, in particular, an optionally repeated query in respect of the neutron source strength at a first control point R1, be this an automated data query, be this within the scope of a user input/user guidance.

A sample is specified and measured in a second step S2, wherein the second step may include at least one of the following sub-steps: detecting the sample mass and, optionally, also the sample geometry (S2.1), collimation (S2.2), detecting or setting the sample partitioning (S2.3), displacing/positioning the sample, in particular by translation and/or rotation (S2.4). Step S2.1 can be implemented in conjunction with a transmission measurement, in particular by virtue of radioactive gamma radiation being emitted toward the sample, for example for detecting a fill level in a drum (sample), or for determining a matrix density. The transmission measurement can also be considered to be an extended measurement for characterizing the sample and may supply further data, in particular also in respect of a partitioning that is as useful as possible. There can be, in particular, an optionally repeated query in respect of the sample mass, sample geometry and partitioning in a second control point R2, be it an automated data query in communication with a camera unit and/or a weighing unit, be it within the scope of a user input/user guidance. In particular, positioning or alignment of the sample can also be implemented at the second control point R2.

Emitted gamma radiation is detected or measured in a third step S3, wherein the third step may include at least one of the following sub-steps: detecting/measuring gamma radiation and evaluating the gamma spectrum (S3.1), element/peak identification (S3.2), interference analysis (S3.3), evaluation of peaks, in particular evaluation in respect of area and background (S3.4). In particular, a transfer and verification of intermediate results can be implemented at a third control point FR3. Here, the control point R3 may comprise a plausibility check, in particular within the scope of a statement about the homogeneous element and mass distribution in the sample or in the respective partition, wherein there may optionally be an iteration back to step S2 (for example in the case of a deviation that is greater than a maximum threshold), in particular in order to measure on the basis of a new collimated approach.

Measured gamma radiation is evaluated in a fourth step S4, in particular in order to calculate the energy-dependent photopeak efficiency, wherein the fourth step may include at least one of the following sub-steps: evaluating interactions within the sample (S4.1) for calculating the energy-dependent photopeak efficiencies, evaluating interactions in a respective detector (S4.2), determining the solid angle between sample and detector (S4.3), determining photopeak efficiencies, in particular (initial) photopeak efficiencies (S4.4). In particular, a transfer and verification of intermediate results can be implemented at a fourth control point R4.

The mass of at least one element is determined in a fifth step S5, wherein the fifth step may include at least one of the following sub-steps: determining at least one elemental mass or determining elemental mass ratios (S5.1), determining at least one cross section (S5.2), in particular from either step S1 or step S4, respectively. In particular, a transfer and verification of intermediate results can be implemented at a fifth control point R5. Here, the control point R5 can comprise a plausibility check, in particular a juxtaposition or comparison of quantified elemental masses and the overall mass of the sample.

The neutronics are calculated in a sixth step S6, wherein the sixth step may include at least one of the following sub-steps: evaluating interactions, in particular neutron interactions within the sample (S6.1), in particular by way of a diffusion approximation, evaluating a neutron spectrum (S6.2), evaluating a neutron flux (S6.3), in particular by diffusion approximation.

Control points R1 to R5 may each comprise an optional feedback (control loop) to the preceding step, in particular within the scope of a verification of a user input or an intermediate result. Steps S4 to S6 can be carried out iteratively, independently of the individual control points, in particular continuously during the evaluation of gamma radiation from continuously irradiated samples. The iteration is terminated if the elemental mass to be determined no longer changes or at least no longer changes substantially, for example below a predeterminable threshold for a difference.

Figure 4:
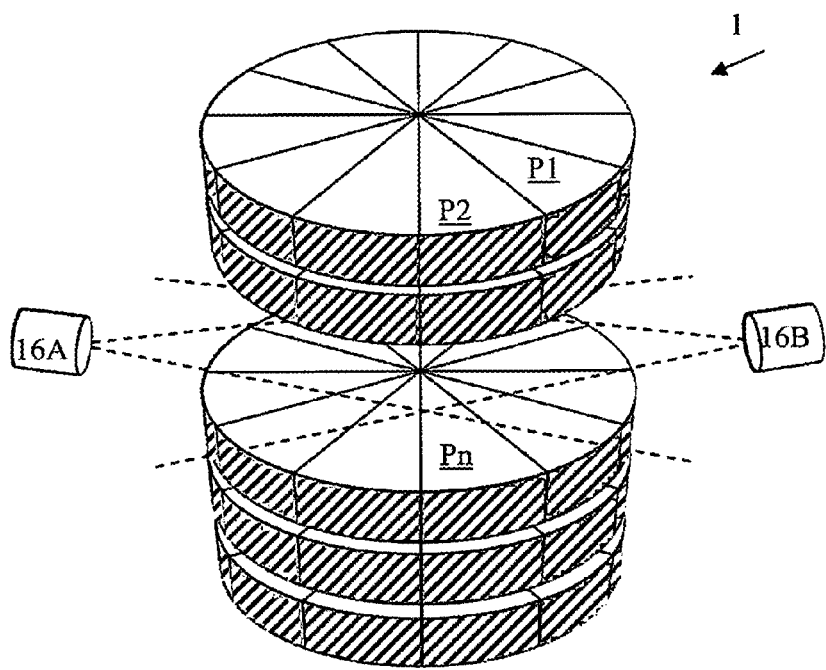
FIG. 4 shows a cylindrical sample with a partitioning in the form of disk segments as an example for partitioning in a method according to an embodiment.

FIG. 4 shows the field of view of a respective detector 16A, 16B using the example of a cylindrical sample 1 that has been partitioned into disks and circular segments P1, P2, Pn. Here, the field of view of the respective detector 16A, 16B need not necessarily correspond to, or lie flush with, a respective partition. To what extent an adjacent partition lies in the field of view of the respective detector can be taken into account during the evaluation, said adjacent partition being intended to be evaluated concurrently or removed by calculation. There are 12 partitions present at each level. Then, the entire sample can be analyzed by six rotations and the corresponding number of translational level displacement steps (here, there are five levels, i.e., four displacement steps in the z-direction). By way of example, each partition is irradiated and measured over a period of time of a few seconds to minutes.

FIG. 5 shows an apparatus 10, in which the sample carrier 14 can be displaced upward in terms of its level by a significant distance (arrow with dotted line). The sample chamber 15 is delimited by material M3, it being possible to displace said material M3 together with the sample 1 into an air-filled cavity above the sample 1. The rotation and lifting device 18 is connected to the sample carrier 14 by means of a coupling comprising a shaft 18.1; apart from this, however, said rotation and lifting device is disposed outside of the neutron shielding and sealed off from the sample chamber. This can ensure that the neutrons do not reach the rotation and lifting device. A pathway for the neutrons to the rotation and lifting device is prevented. The material guiding the shaft 18.1 is preferably graphite. As indicated in FIG. 5, a passage for the shaft 18.1 can be provided in a graphite block. Preferably, the rotation and lifting device 18 is only connected to the sample carrier 14 by means of the shaft 18.1. The neutron shielding is only penetrated by the shaft in that case. The rotation and lifting device is disposed in sealed-off fashion behind the effective neutron shielding.

Figure 6:
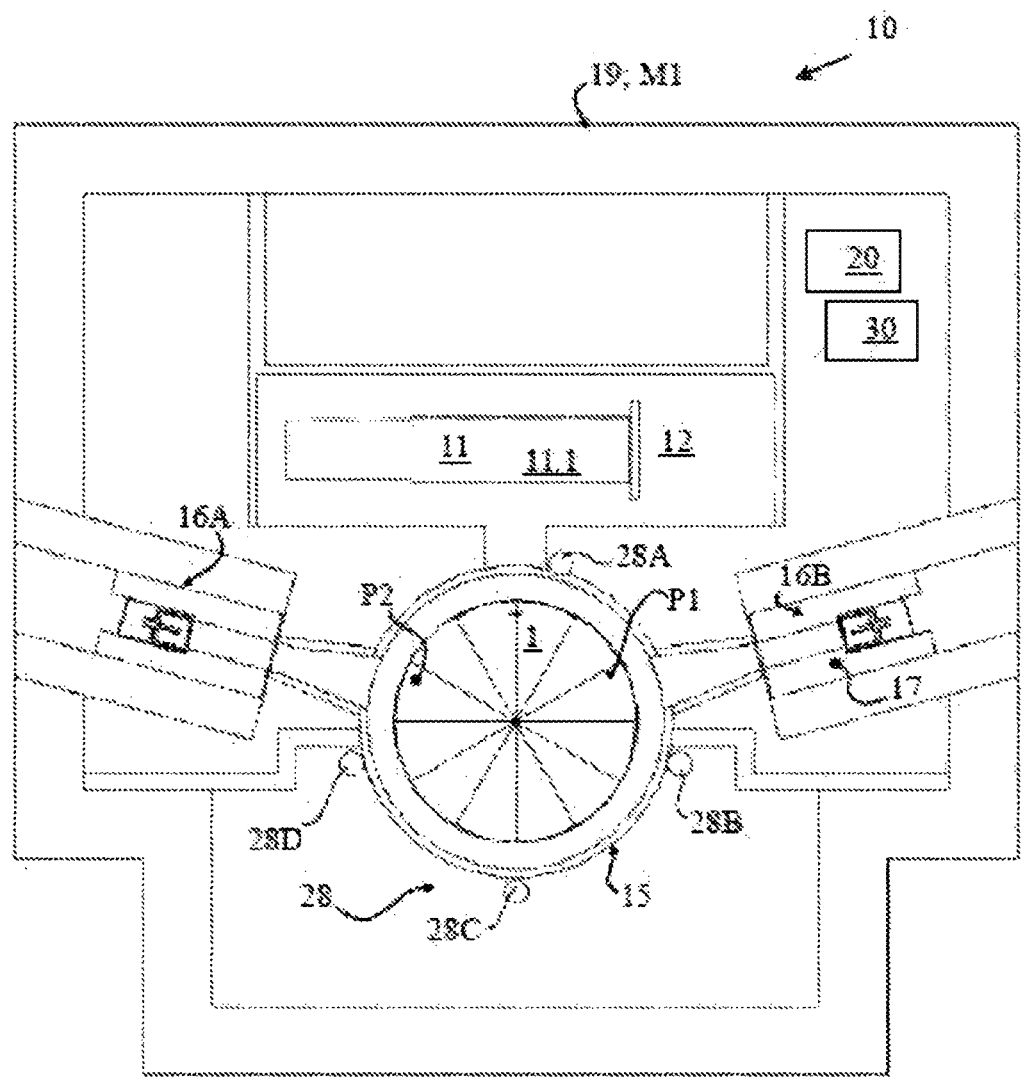
FIG. 6 shows a schematic illustration of a sample chamber with, disposed therein, neutron detectors of a neutron detector unit of an apparatus for nondestructive multielement analysis according to one exemplary embodiment.

FIG. 6 shows an apparatus 10 for nondestructive multi-element analysis, in which four neutron detectors 28A, 28B, 28C, 28D of a neutron detector unit 28 are disposed in the sample chamber 15. The neutron detectors disposed in exemplary fashion here are disposed with a uniform distribution about the circumference of the sample chamber 15. Optionally, more than four neutron detectors may also be provided. The neutron detectors are preferably disposed on the installation level of the gamma detectors. The neutron detector unit 28 can bring about a spatially resolved and energy-resolved determination of the neutron flux, in particular the absolute or total neutron flux of a respective partition, externally from the sample.

LIST OF REFERENCE SIGNS

1 Sample
10 Apparatus for multielement analysis on the basis of neutron activation
11 Neutron generator
11.1 Neutron source or neutron source point
12 Moderation chamber
14 Sample carrier
15 Sample chamber
16 Detector unit
16A, 16B Individual detector
16.1 Crystal of an individual detector
16.2 Detector end cap
16.3 Crystal holder
17 Collimator
18 Rotation and lifting device
18.1 Coupling, in particular shaft
19 Shielding
20 Control device
21 Data memory
22 Nuclear physics database
23 Input unit/mask
24 Transmission measuring unit
25 Camera unit
27 Weighing unit
28 Neutron detector unit
28A, 28B, 28C, 28D Individual neutron detector
30 Computer program product
A16 Visual axis of the detector
M1 Material 1, in particular borated polyethylene and/or cement
M2 Material 2, in particular lead and/or bismuth
M3 Material 3, in particular graphite
M4 Material or medium 4, in particular air
M6 Material 6, in particular lithium polyethylene and/or lithium silicone
M7 Material 7, in particular aluminum and/or carbon fiber reinforced plastic
M8 Material 8, in particular copper or plastic
M10 Material 10, in particular germanium
P1, P2, Pn Partitions of the sample
R1 First control point
R2 Second control point
R3 Third control point
R4 Fourth control point
R5 Fifth control point
S1 First step, in particular generating neutrons and irradiating by neutrons
S1.1 Setting (controlling or regulating) the neutron source strength
S1.2 Moderation
S1.3 Calculating the neutron spectrum by simulation
S1.4 calculating the neutron flux by simulation
S2 Second step, in particular sample specification and measurement
S2.1 Detecting sample mass and/or sample geometry and/or a transmission measurement
S2.2 Collimation
S2.3 Detecting or setting the sample partitioning
S2.4 Displacing/positioning the sample, in particular by translation and/or rotation S3 Third step, in particular detecting/measuring emitted gamma radiation and evaluating measured gamma radiation
S3.1 Detecting/measuring gamma radiation or evaluating the gamma spectrum
S3.2 Element/peak identification
S3.3 Interference analysis
S3.4 Evaluation of peaks, in particular in respect of peak area and background
S4 Fourth step, in particular evaluating measured gamma radiation
S4.1 Evaluating interactions within the sample
S4.2 Evaluating interactions in the detector
S4.3 Determining the solid angle between sample and detector
S4.4 Determining photopeak efficiencies, in particular initial photopeak efficiencies
S5 Fifth step, in particular determining at least one element, in particular the mass
S5.1 Determining at least one elemental mass or elemental mass ratios
S5.2 Determining at least one cross section
S6 Sixth step, in particular calculating the neutronics
S6.1 Evaluating interactions within the sample
S6.2 Evaluating a neutron spectrum
S6.3 Evaluating a neutron flux
v1 First variable/parameter, in particular able to be input manually, in particular neutron source strength
v2 Second variable/parameter, in particular able to be input manually, in particular sample geometry
v3 Third variable/parameter, in particular able to be input manually, in particular sample mass
x Longitudinal axis
y Transverse axis
z Vertical axis

The invention claimed is:
1. A method for a multielement analysis on the basis of neutron activation, the method comprising:
generating fast neutrons with an energy in the range of 10 keV to 20 MeV and moderating the neutrons;
irradiating the sample with the neutrons; and
measuring the gamma radiation emitted by the irradiated sample by means of at least one detector in order to determine at least one element of the sample,
wherein,
the sample is irradiated continuously in non-pulsed fashion,
the measurement is implemented during the irradiation,
at least prompt or both prompt and delayed gamma radiation from the continuous neutron irradiation is measured and evaluated for the purposes of determining the at least one element,
the sample is subdivided into individual partitions and the measurement is implemented using a collimator, surrounding the respective detector, in respect of the respective partitions,
the determination of the at least one element comprises an evaluation of the measured gamma radiation, and
the evaluation comprises a spatially resolved and energy-resolved determination of the neutron flux within the respective partition of the sample and calculation of energy-dependent photopeak efficiencies and neutron flux and neutron spectrum within a single partition of the sample by an approximation method.
2. The method as recited in claim 1, wherein the irradiation and measurement is implemented over a period of time of at least one second.

3. The method as recited in claim 1, wherein,
only delayed gamma radiation from continuous neutron irradiation is measured and evaluated, at least intermittently, in order to determine the at least one element, or
the measurement or determination is implemented on an individual basis in respect of the individual partitions of the sample, said partitions being predefined or predeterminable manually or automatically by way of collimation.
4. The method as recited in claim 1, wherein,
for the purposes of determining the at least one element, the gamma radiation emitted by the sample is measured in energy-resolved fashion by determining photopeak count rates, and
the determination comprises an energy-resolved evaluation of the measured gamma radiation in accordance with gamma spectra of the respective partitions.
5. The method as recited in claim 1, wherein the measurement/evaluation comprises an energy-resolved measurement/evaluation of the intensity of the gamma radiation emitted by the sample.
6. The method as recited in claim 1, wherein,
the evaluation comprises correlating, on the basis of its energy, at least one photopeak in the count rate-energy diagram with an element of the sample, or
the evaluation further comprises quantifying the mass fraction of the at least one element of the sample by virtue of the component of the at least one element contained in the sample being evaluated after subtracting a background signal from the net area of a/the photopeak, which is caused by the element in a count rate-energy diagram.
7. The method as recited in claim 1, wherein the neutron flux within the respective partition of the sample is calculated on the basis of a diffusion approximation of the linear Boltzmann equation, in particular on the basis of the following relationship:

$$\Phi(x,E_n) = \int_{s2} \Psi(x,E_n,\Omega) d\Omega.$$

8. The method as recited in claim 1, wherein the calculation of energy-dependent photopeak efficiencies and neutron flux and neutron spectrum within an individual partition of the sample by calculating neutron flux and neutron spectrum by way of an approximation method is implemented in each case on the basis of the following relationship:

$$\Phi(x,E_n) = \int_{s2} \Psi(x,E_n,\Omega) d\Omega.$$

9. The method as recited in claim 1, wherein, during the evaluation, a multiplicity of gamma energies, respectively of at least one element in the respective partition of the sample, are analyzed when quantifying the mass fraction of the respective element in the respective petition, said analysis being based on the following relationship:

$$(P_R)^i_{E_\gamma} = \frac{N_A}{M} \cdot \sum_{k=1}^{K} m_k \cdot \varepsilon^{i \leftarrow k}_{E_\gamma} \cdot \sigma^{ik}_{E_\gamma} \cdot \Phi^i_k.$$

10. The method as recited in claim 1, wherein,
the method is carried out on the basis of the input variables of neutron source strength, sample geometry and sample mass, in particular exclusively on the basis of said three input variables, and
the method is carried out iteratively, in each case with respect to individual elements and/or with respect to the respective partition of the sample and/or with respect to the complete composition of the sample.

11. The method as recited in claim 1, wherein the method is carried out in automated fashion by evaluating the measured gamma radiation on the basis of purely numerically ascertained parameters apart from the three parameters of neutron source strength during the irradiation, sample geometry and sample mass.

12. The method as claimed in claim 1, wherein the spatially resolved and energy-resolved determination of the neutron flux, in particular of the total neutron flux of a respective partition, is implemented within the sample chamber and outside of the sample, in particular by means of a plurality of neutron detectors disposed within the sample chamber.

13. A computer program product configured to carry out a multielement analysis on the basis of neutron activation as per the method as recited in claim 1 when the method is executed on a computer and configured to determine at least one element of a sample, irradiated in non-pulsed continuous fashion with neutrons, by evaluating at least prompt or else prompt and delayed gamma radiation, emitted by the sample, in respect of the composition of the sample on the basis of energy-dependent photopeak efficiencies and neutron flux and neutron spectrum within a respective partition of the sample, and further configured to evaluate gamma radiation measured in partition-collimated fashion by virtue of a plurality of gamma energies, respectively of the at least one element, being analyzed in the respective partition of the sample when quantifying the mass fraction of the respective element of the respective partition on the basis of the net photopeak count rate registered during the multielement analysis, in particular on the basis of the following relationship:

$$(P_R)^i_{E_\gamma} = \frac{N_A}{M} \cdot \sum_{k=1}^{K} m_k \cdot \varepsilon^{j \leftarrow k}_{E_\gamma} \cdot \sigma^{ik}_{E_\gamma} \cdot \Phi^i_k.$$

14. An apparatus configured to carry out a multielement analysis on the basis of neutron activation as per the method as recited in claim 1, the apparatus comprising:
 a neutron generator configured to generate fast neutrons;
 a sample chamber and a sample holder disposed therein; and
 a detector unit comprising at least one detector configured to measure gamma radiation emitted by an irradiated sample, for the purposes of determining at least one element of the sample, wherein,
 the apparatus comprises a control device that is configured to carry out a method as claimed in claim 1,
 the apparatus is configured to irradiate a/the sample in non-pulsed continuous fashion,
 the apparatus comprises at least one collimator that restricts the field of view of the detector to a respective partition of the sample, and
 the apparatus is configured to evaluate the measurements of the partitions by quantifying the mass fraction of the at least one element of the sample.

15. The apparatus as recited in claim 14, wherein the neutron generator comprises a neutron source configured to fuse deuterons, in particular using deuterium gas as a fuel.

16. The apparatus as recited in claim 14, wherein the apparatus comprises at least one component that attenuates a background signal of the apparatus, said component being selected from the following group: at least one collimator made of lead or bismuth, said collimator restricting the field of view of the detector to the respective partition of the sample, and/or a moderation chamber made of graphite, and/or a shielding made of borated polyethylene, and/or a sample chamber and/or a sample carrier, each at least partly made of graphite or completely fluorinated plastics or beryllium.

17. The apparatus as recited in claim 14, further comprising:
 a computer program product or a data memory therewith, wherein,
 the computer program product is configured to determine the at least one element of the sample by evaluating the measured gamma radiation on the basis of energy-dependent photopeak efficiencies and a neutron flux and neutron spectrum within the respective partition of the sample.

18. The apparatus as recited in claim 14, wherein the detector unit comprises at least two detectors, in particular in symmetric arrangement relative to the neutron generator or relative to at least one neutron source of the apparatus.

19. The apparatus as recited in claim 14, wherein the neutron generator is configured to fuse deuterons for the purposes of generating fast neutrons.

20. An apparatus configured to carry out the multielement analysis on the basis of a neutron activation as per the method as recited in claim 1.

* * * * *